(12) United States Patent
Sawada et al.

(10) Patent No.: US 11,231,598 B2
(45) Date of Patent: Jan. 25, 2022

(54) CONTACT LENS AND METHOD FOR MANUFACTURING THE SAME

(71) Applicant: HOYA CORPORATION, Tokyo (JP)

(72) Inventors: Yohei Sawada, Tokyo (JP); Takaharu Nakajima, Tokyo (JP); Naoki Tsuji, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 574 days.

(21) Appl. No.: 16/301,708

(22) PCT Filed: Nov. 25, 2016

(86) PCT No.: PCT/JP2016/084987
§ 371 (c)(1),
(2) Date: Nov. 14, 2018

(87) PCT Pub. No.: WO2017/221439
PCT Pub. Date: Dec. 28, 2017

(65) Prior Publication Data
US 2019/0317337 A1    Oct. 17, 2019

(30) Foreign Application Priority Data

Jun. 20, 2016    (JP) .............................. JP2016-121418

(51) Int. Cl.
*G02C 7/00*    (2006.01)
*G02C 5/00*    (2006.01)
(Continued)

(52) U.S. Cl.
CPC ............. *G02C 7/044* (2013.01); *G02C 7/048* (2013.01)

(58) Field of Classification Search
CPC . G02C 7/042; G02C 5/00; G02C 7/02; G02C 7/04; G02C 1/08; A61B 3/1005
(Continued)

(56) References Cited

U.S. PATENT DOCUMENTS 4,573,775 A    3/1986  Bayshore
4,580,882 A *  4/1986  Nuchman ............ G02B 5/1876
                                                351/159.41
(Continued)

FOREIGN PATENT DOCUMENTS

EP    2 278 387 A1    1/2011
JP    S59-53812 A     3/1984
(Continued)

OTHER PUBLICATIONS

Dec. 25, 2018 International Preliminary Report on Patentability issued in International Patent Application No. PCT/JP2016/084987.
(Continued)

*Primary Examiner* — Dawayne Pinkney
(74) *Attorney, Agent, or Firm* — Oliff PLC

(57) ABSTRACT

There is provided a contact lens having a convex front surface and a concave rear surface, the front surface being divided into an optical portion, an edge joining the front and rear surfaces, a first smoothing portion arranged on an outer periphery of the optical portion, a peripheral portion arranged on an outer periphery of the first smoothing portion, and a second smoothing portion connecting the peripheral portion and the edge, the front surface having mirror image symmetry with respect to a vertical meridian as a boundary extending from an upper end of the lens to a lower end of the lens passing through a midpoint of the lens, and having mirror image symmetry also with respect to the horizontal meridian perpendicular to the vertical meridian at the lens midpoint, the peripheral portion being arranged to include the horizontal meridian, and configured of: a first peripheral portion arranged to include the horizontal meridian and having a shape so as to maximize a thickness of the contact lens on the horizontal meridian, a second peripheral portion arranged to include the vertical meridian and having a shape so as to minimize the thickness of the contact lens
(Continued)

on the vertical meridian, a first peripheral auxiliary portion which is a portion adjacent to the first peripheral portion, having a surface shape so as to keep the thickness of the contact lens constant; and an inclined portion which is a portion connecting the first peripheral auxiliary portion and the second peripheral portion to form a continuous surface, and having a surface shape that changes the thickness of the contact lens.

16 Claims, 20 Drawing Sheets

(51) Int. Cl.
　　*G02C 3/00* (2006.01)
　　*G02C 7/04* (2006.01)
(58) Field of Classification Search
　　USPC .................. 351/159.47, 41, 159.01, 159.02,
　　　　　　351/159.73–159.77, 178, 159, 160 R, 161,
　　　　　　　　　　　　　　351/168, 169, 147, 177
　　See application file for complete search history.

(56) References Cited

U.S. PATENT DOCUMENTS

| | | | |
|---|---|---|---|
| 5,652,638 | A | 7/1997 | Roffman et al. |
| 6,109,749 | A | 8/2000 | Bernstein |
| 6,286,956 | B1 | 9/2001 | Oyama et al. |
| 6,467,903 | B1 | 10/2002 | Back |
| 2003/0016331 | A1 | 1/2003 | Mandell |
| 2004/0021824 | A1 | 2/2004 | Ye et al. |
| 2004/0156013 | A1 | 8/2004 | Lindacher et al. |
| 2004/0233382 | A1 | 11/2004 | Lindacher et al. |
| 2005/0068489 | A1 | 3/2005 | Hall et al. |
| 2005/0259220 | A1 | 11/2005 | Neadle et al. |
| 2011/0149230 | A1 | 6/2011 | Menezes et al. |
| 2012/0206692 | A1 | 8/2012 | Yamaguchi et al. |
| 2012/0242952 | A1* | 9/2012 | Nakajima .............. G02C 7/048 351/159.38 |
| 2013/0077045 | A1 | 3/2013 | Gerligand et al. |
| 2015/0370090 | A1 | 12/2015 | Ehrmann et al. |
| 2020/0041816 | A1* | 2/2020 | Gifford .................. G02C 7/049 |

FOREIGN PATENT DOCUMENTS

| | | |
|---|---|---|
| JP | H09-015541 A | 1/1997 |
| JP | 2000-122007 A | 4/2000 |
| JP | 2001-522065 A | 11/2001 |
| JP | 2004-506925 A | 3/2004 |
| JP | 2005-502072 A | 1/2005 |
| JP | 2005-534966 A | 11/2005 |
| JP | 2005-534985 A | 11/2005 |
| JP | 2006-529029 A | 12/2006 |
| JP | 2007-538288 A | 12/2007 |
| WO | 2009/139021 A1 | 11/2009 |
| WO | 2011/061790 A1 | 5/2011 |
| WO | 2014/020634 A1 | 2/2014 |

OTHER PUBLICATIONS

Feb. 21, 2017 International Search Report issued in International Patent Application No. PCT/JP2016/084987.
Nov. 5, 2019 Office Action issued in Japanese Patent Application No. 2016-121418.
Jan. 17, 2020 Extended Search Report issued in European Patent Application No. 16906355.9.

* cited by examiner

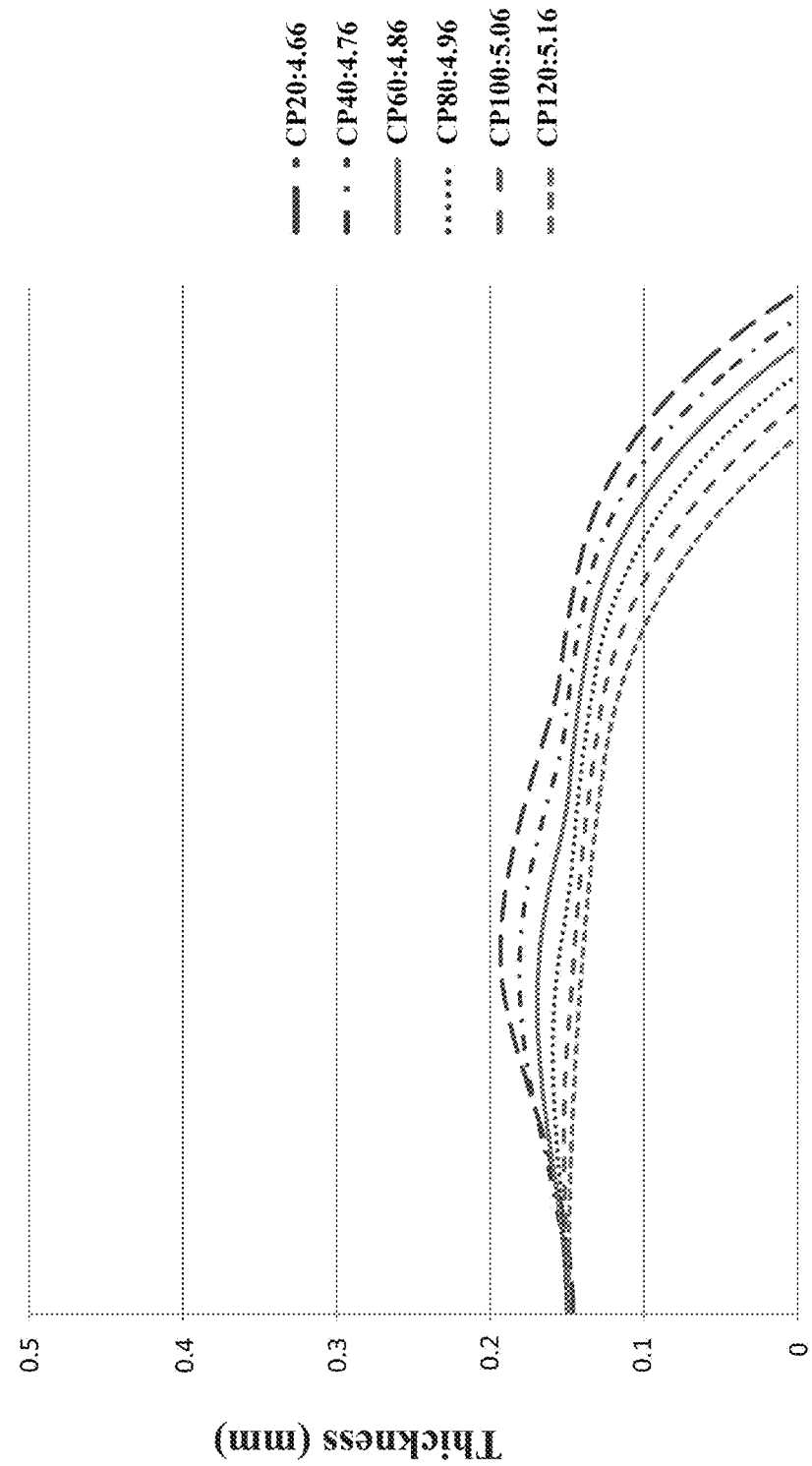

FIG. 10

| Name | Fill pattern | Thickness (mm) |
|---|---|---|
| Grid | | 0.2 or more |
| Vertical stripes | | 0.2 |
| Oblique lines | | More than 0.15 and less than 0.2 |
| Horizontal stripes | | 0.15 |

CONTACT LENS AND METHOD FOR MANUFACTURING THE SAME

TECHNICAL FIELD

The present invention relates to a contact lens, and in particular, to a contact lens having a double slab off as an axis stabilizing mechanism for increasing a horizontal thickness as compared to a vertical thickness of a contact lens, and a method for manufacturing the same.

DESCRIPTION OF RELATED ART

Contact lenses are widely used for correcting visual impairment, for example. The visual impairment includes, for example, myopia, hyperopia, astigmatism and presbyopia. Myopia or hyperopia is a state in which parallel light beams are focused in front of or behind a retina in a state of not exerting an adjustment power, and one of correction methods for myopia and hyperopia is a contact lens (also called a myopic/hyperopic lens). Astigmatism is a state in which light emitted from one point of an outside world does not converge to one point in an eye due to a fact that a cornea or a crystalline lens shape is not a perfect spherical surface (for example, a refractive index in a vertical direction differs from a refractive index in a horizontal direction), and one method of correcting astigmatism is a toric contact lens (also called astigmatism lens). Presbyopia (farsightedness) is a state in which power to adjust the focus of the eye from a distant object to a nearby object is reduced by age, and one of the correction methods for presbyopia is a multifocal contact lens (also called a bifocal lens).

In the toric contact lens, an optical portion is formed by a toroidal surface for correcting astigmatism, and therefore it is necessary to stabilize a posture of the lens. Therefore, an axis stabilizing mechanism is provided around the optical portion. The axis stabilizing mechanism can be divided into Truncation (Patent Documents 1 and 2), Ridges (Patent Documents 3 and 4), Prism Ballast (Patent Documents 5 and 6) and Double Slab Off (Patent Documents 7 and 8). Further, in the multifocal contact lens, the power of the lens is distributed so that a distance vision area for distance vision and a near vision area for near vision are arranged in the optical portion (Patent Document 9). Further, multifocal toric contact lenses combining a toric surface for correcting astigmatism and a multifocal power for correcting presbyopia in the optical portion has also been developed (Patent Documents 10 and 11).

PRIOR ART DOCUMENT

Patent Document

[Patent Document 1] Japanese Patent Laid-Open Publication No. 1984-53812
[Patent Document 2] Published Japanese Translation of PCT International Application No. 2005-502072
[Patent Document 3] Published Japanese Translation of PCT International Application No. 2001-522065
[Patent Document 4] Published Japanese Translation of PCT International Application No. 2005-534985
[Patent Document 5] Published Japanese Translation of PCT International Application No. 2004-506925
[Patent Document 6] Published Japanese Translation of PCT International Application No. 2006-529029
[Patent Document 7] WO 2009/139021
[Patent Document 8] Published Japanese Translation of PCT International Application No. 2007-538288
[Patent Document 9] Japanese Patent Laid-Open Publication No. 1997-15541
[Patent Document 10] WO 2011/061790
[Patent Document 11] Published Japanese Translation of PCT International Application No. 2005-534966

SUMMARY OF THE INVENTION

Problem to be Solved by the Invention

Incidentally, when trying to deploy an axis stabilizing mechanism by combining toric with a multifocal contact lens, further when handling a toric contact lens which is not multi-focal (this lens is also called a (multi-focal) toric contact lens), the following problem occurs. In a case of a multifocal toric contact lens with truncation (example: prior documents 1 and 2), although it is suitable as a special order for wearers with unique eyes because of its characteristic shape, it is not suitable for mass production. Further, compared with a simple spherical lens, an entire lens has a distorted shape, and foreign body feeling (deterioration of wearing feeling) inevitably occurs.

In the case of a multifocal toric contact lens having a ridge (for example, prior art documents 3 and 4), a raised ridge at a lower part of the lens is engaged with a lower eyelid and positional stability and directivity can be obtained. However, the degree of engagement between the lower eyelid and the ridge is not suitable for mass production because there are individual differences in the lower eyelid. Further, the upper eyelid more easily hits a ridge convex shape, and the wearing feeling is inferior to the spherical lens.

In the case of a multifocal toric contact lens with a prism ballast (for example, prior art documents 5, 6 and 9), the prism is formed over the entire lens, and therefore a thickness is increased from an upper end part of the lens to a lower end part of the lens, and the prism also remains in the optical portion in which the multifocal is formed. As a result, the prism of the optical portion acts as a hindrance factor for correcting the distance vision area and correcting the near vision area, and in order to solve this problem, more complicated optical design is required. Further, since ballast is formed on a part of the lens, the lens more easily falls downward than a usual lens. In this case, centering of the lens becomes difficult, and in order to ensure centering, the necessity of machining to obtain a balance is generated by scraping off somewhere in the lens to make it thin. When processed, the entire lens has a distorted shape as compared with a spherical lens, resulting in a foreign body feeling.

In the case of the multifocal toric contact lens with double slab off (for example, prior art documents 10 and 11), the lens has bilateral symmetry and vertical symmetry, and therefore centering by the wearer is easy to be obtained, bifocal optical design is easy to be exhibited, and no prism is formed in the lens, and therefore it is possible to expect an effect of not allowing the hindrance factor to occur in the optical design of the distance vison area or the near vision area. However, in order to secure axis stability with double slab off without ballast, it is necessary to distribute the thickness in such a way that a thick region is formed so as to emphasize a peripheral portion, or a thin region of the peripheral portion is expanded, thus distorting a lens shape compared with a spherical lens. Further, in a case of a thickness design in which astigmatism correction is provided on the optical portion of the front surface and double slab off is provided on the peripheral portion of the front surface, and multifocal is provided on the optical portion on the rear surface (for example: prior document 11), the lens has optical properties aiming at different effects on the front and rear surfaces. Therefore, a lens specializing in optical design and processing can be provided. However, each of the front and rear surfaces requires a characteristic shape, therefore as a result, the entire lens has a distorted shape, and the wearing feeling is deteriorated as compared with a spherical lens.

Thus, it is requested to develop the (Multifocal) toric contact lens capable of exhibiting bifocal optical design to the maximum and correcting astigmatism fully effectively, and in addition, capable of obtaining good wearing feeling.

In view of the above-described circumstance, an object of the present invention is to provide a contact lens capable of correcting astigmatism fully effectively (preferably correcting presbyopia in addition to correcting astigmatism), and a method for manufacturing the same. Also, an object of the present invention is to provide a contact lens capable of providing excellent wearing feeling in addition to improving centering performance and axis stability, and a method for manufacturing the same.

Means for Solving the Problem

In order to solve such a problem, the inventors of the present invention have found an invention having the following configuration. Namely, there is provided a contact lens having a convex front surface and a concave rear surface, the front surface being divided into an optical portion, an edge joining the front and rear surfaces, a first smoothing portion arranged on an outer periphery of the optical portion, a peripheral portion arranged on an outer periphery of the first smoothing portion, and a second smoothing portion connecting the peripheral portion and the edge, the front surface having mirror image symmetry with respect to a vertical meridian as a boundary extending from an upper end of the lens to a lower end of the lens passing through a midpoint of the lens, and having mirror image symmetry also with respect to the horizontal meridian perpendicular to the vertical meridian at the lens midpoint, the peripheral portion being arranged to include the horizontal meridian, and configured of:

a first peripheral portion arranged to include the horizontal meridian and having a shape so as to maximize a thickness of the contact lens on the horizontal meridian, a second peripheral portion arranged to include the vertical meridian and having a shape so as to minimize the thickness of the contact lens on the vertical meridian, a first peripheral auxiliary portion which is a portion adjacent to the first peripheral portion, having a surface shape so as to keep the thickness of the contact lens constant; and an inclined portion which is a portion connecting the first peripheral auxiliary portion and the second peripheral portion to form a continuous surface, and having a surface shape that changes the thickness of the contact lens.

According to the present invention, an entire lens has mirror image symmetry with respect to the vertical direction and the horizontal direction, and therefore the lens is more easily to be arranged in the cornea center during wearing. By improving the centering performance of the lens, it is possible to improve accuracy of correcting presbyopia in the distance vision area and the near vision area allocated to a desired area in the optical portion.

Further, since the first peripheral portion having a largest thickness is arranged so as to include the horizontal meridian, and the second peripheral portion having a smallest thickness is arranged so as to include the vertical meridian perpendicular to the horizontal meridian, the first peripheral portion is pushed out to the ear/nose side by the eyelid for every blinking. Further, since the first peripheral auxiliary portion having the surface with constant thickness is adjacent to the first peripheral portion, it is possible to help the eyelid move to the first peripheral portion. As a result, axis stability is improved, and in the case of a multifocal lens, good presbyopia correction can be obtained even in an elliptical optical portion.

Then, the first smoothing portion smoothly connects the optical portion (for example, the elliptical optical portion formed for correcting astigmatism and having a long axis in a horizontal direction), and the peripheral portion formed for axis stability (for example, elliptical and annular peripheral portion in correspondence with the optical portion), and the second smoothing portion smoothly connects the elliptical annular peripheral portion formed for axis stability and a perfect circular edge, and the inclined portion smoothly connects the first peripheral auxiliary portion and the second peripheral portion having different heights (thicknesses). In this way, centering performance and axis stability are improved and a good wearing feeling is obtained.

Second, a radial width of the peripheral portion is constant, and third, a surface area ratio of the peripheral portion to the front surface is 1:99 to 10:90. This makes it possible to fully secure a region of the second smoothing portion surrounded by the peripheral portion and the edge, without narrowing the areas for correcting presbyopia and correcting astigmatism, while ensuring the axis stability although the peripheral stability is kept to a minimum. As a result, the difference from the spherical lens becomes small, and the wearing feeling is improved. Further, by simultaneously providing the optical design and the axis stabilizing mechanism having both of correcting presbyopia and correcting astigmatism on the front surface of the lens, an aspherical shape that matches a cornea can be provided to the lens rear surface, which greatly affects the wearing feeling.

Fourth, the thickness as viewed in the radial direction is constant in the first peripheral portion, fifth, the thickness as viewed in the circumferential direction is decreased in the first peripheral portion when rotating from the horizontal meridian to the vertical meridian, and sixth, the thickness as viewed in the radial direction is constant in the second peripheral portion, and seventh, a radial width of the first peripheral auxiliary portion is decreased when rotating from the horizontal meridian to the vertical meridian, and a radial width of the second peripheral portion is increased when rotating from the horizontal meridian to the vertical meridian, and the boundary between the inclined portion and the second peripheral portion is parallel to the horizontal meridian. As a result, the centering performance and the axis stability are further improved, and good wearing feeling is also obtained. The radial width of the first peripheral auxiliary portion may be a configuration unit that is decreased when rotating from the horizontal meridian to the vertical meridian. Also, the radial width of the second peripheral portion may be a configuration unit that is increased when rotating from the horizontal meridian to the vertical meridian. Further, the boundary between the inclined portion and the second peripheral portion may be a configuration unit that is parallel to the horizontal meridian.

Eighth, by forming the optical portion by a toroidal surface, it is possible to provide a toric contact lens having an astigmatism correcting function.

Ninth, in the optical portion, regions of different powers are arranged in an elliptical shape, including a distance vision portion for a distance vision arranged at a center of the optical portion, and a first intermediate portion arranged on the outer periphery of the distance vision portion and having a power distribution continuously increasing from the power of the distance vision portion, and a near vision portion for a near vision arranged on the outer periphery of the first intermediate portion. Further, tenth, in the optical portion, regions of different powers are arranged in an elliptical shape, including the near vision portion arranged at a center of the optical portion, a second intermediate portion arranged on the outer periphery of the near vision portion and having a power distribution continuously decreasing from the power of the near vision portion, and a distance vision portion arranged on the outer periphery of the second intermediate portion. This makes it possible to provide a multi focal contact lens.

Eleventh, by using a hydrogel or a silicone hydrogel as a lens material, it is possible to provide a soft contact lens having a good wearing feeling and provide a silicone hydrogel contact lens having high oxygen permeability.

Twelfth, by setting the center thickness in the optical portion to be in a range of 0.05 to 0.20 mm, the wearing feeling can be improved.

Thirteenth, within a predetermined rotation angle range of the rotation from the horizontal meridian to the vertical meridian in the peripheral portion, the first peripheral auxiliary portion is arranged on one side of an inner peripheral side or an outer peripheral side, and the inclined portion is arranged on the other side of the inner peripheral side or the outer peripheral side, so that the both are made to coexist. In addition, fourteenth, the first peripheral auxiliary portion is arranged on the inner peripheral side and the inclined portion is arranged on the outer peripheral side so that the both are made to coexist. Exquisite axis stability is improved favorably in the region of the peripheral portion when rotating from the horizontal meridian to the vertical meridian, due to coexistence of the first peripheral auxiliary portion and the inclined portion, in the detailed configuration as described above.

Fifteenth, a shape of the peripheral portion is made to be elliptical and annular having a long axis in the horizontal direction. This is the configuration as an example. Thereby, it is possible to secure a wide second peripheral portion on the vertical meridian.

Sixteenth, there is provided a method for manufacturing a contact lens using a cast mold manufacturing method, the contact lens having a convex front surface and a concave rear surface, the front surface being divided into an optical portion, an edge joining the front and rear surfaces, a first smoothing portion arranged on an outer periphery of the optical portion, a peripheral portion arranged on an outer periphery of the first smoothing portion, and a second smoothing portion connecting the peripheral portion and the edge, the front surface having mirror image symmetry with respect to a vertical meridian as a boundary extending from an upper end of the lens to a lower end of the lens passing through a midpoint of the lens, and having mirror image symmetry also with respect to the horizontal meridian perpendicular to the vertical meridian at the lens midpoint, the peripheral portion being arranged to include the horizontal meridian, and configured of:

a first peripheral portion arranged to include the horizontal meridian and having a shape so as to maximize a thickness of the contact lens on the horizontal meridian, a second peripheral portion arranged to include the vertical meridian and having a shape so as to minimize the thickness of the contact lens on the vertical meridian, a first peripheral auxiliary portion which is a portion adjacent to the first peripheral portion, having a surface shape so as to keep the thickness of the contact lens constant; and an inclined portion which is a portion connecting the first peripheral auxiliary portion and the second peripheral portion to form a continuous surface, and having a surface shape that changes the thickness of the contact lens.

Advantage of the Invention

According to the contact lens of the present invention, good wearing feeling is obtained together with improved centering performance and axis stability as compared with a conventional contact lens. As a result, the bifocal optical design can be exhibited to the maximum and astigmatism can be corrected fully effectively.

BRIEF DESCRIPTION OF THE DRAWINGS

FIG. 9D is a view for explaining the lens cross section along the horizontal meridian near the lens upper end portion of the contact lens, and is a view showing a thickness variation of the cutting planes CP 20 to CP 120 in FIG. 9C.

FIG. 10 is a table defining the degrees of the thickness distribution shown in FIGS. 6B and 6C.

DETAILED DESCRIPTION OF THE INVENTION

The above-described objects, features and advantages of the present invention will become more apparent from the following detailed description of embodiments and examples with reference to the drawings. Embodiments of the present invention will be described hereafter, with reference to the drawings. It should be noted that the present invention is not limited to the following examples. Moreover, FIG. 1*a* and Table 1a are mainly represented like FIG. 1A and Table 1 (a). Moreover, in the present invention, "smoothly connecting (combining, joining, reducing thickness, etc.)" means that objects to be connected together form one continuous surface, and means that discontinuous sharp irregularities do not appear suddenly. Further, in the present invention, "constant thickness" means that the thickness of the contact lens is equal within a predetermined region (for example, in-plane), and also referred to as a uniform thickness and flat.

Figure 1A:
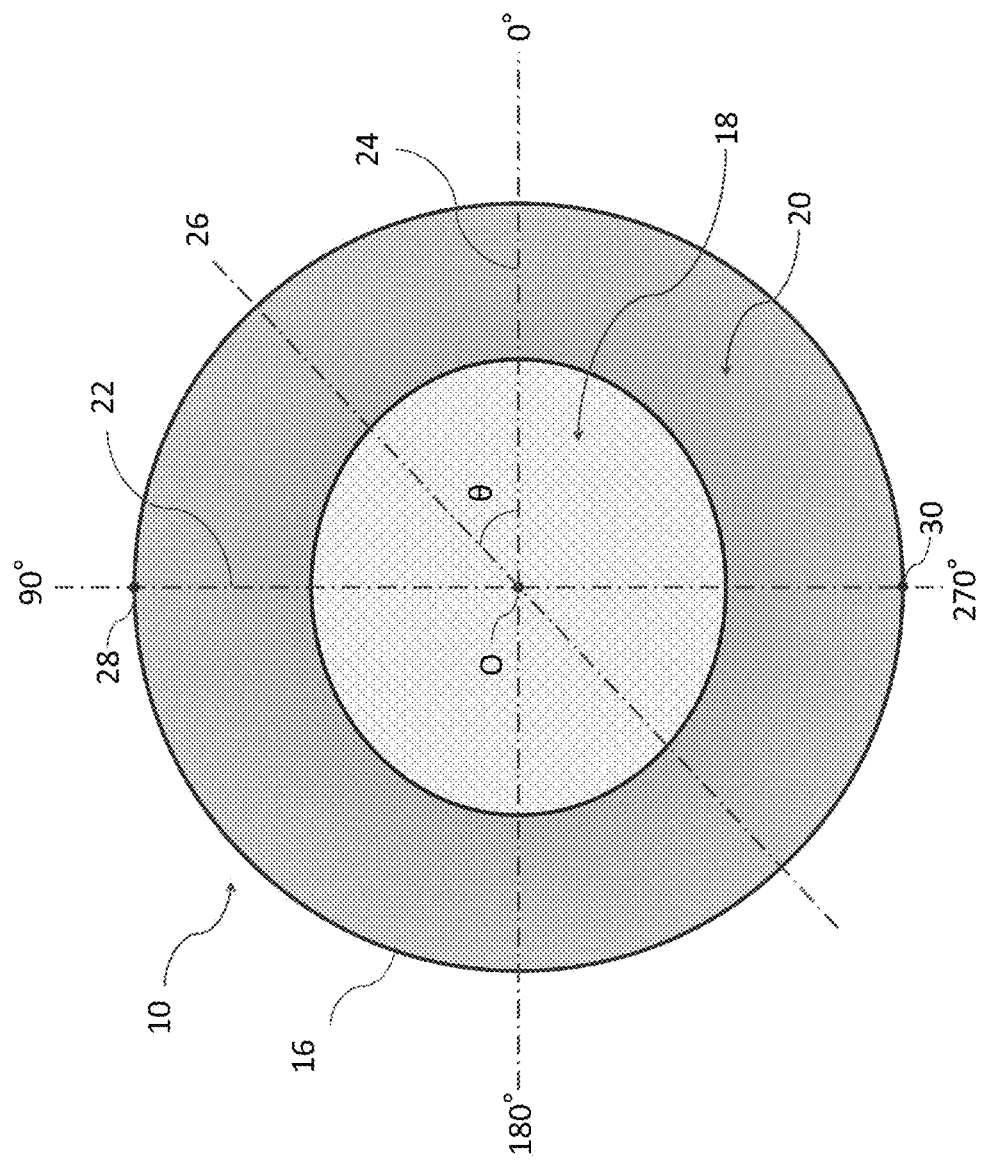
FIG. 1A is a view for explaining a configuration of a contact lens according to an embodiment of the present invention, and is a front view of the same contact lens.

As shown in FIG. 1A, the contact lens 10 (sometimes simply referred to as a lens) is formed by a convex front surface (also referred to as a front curve) 12 and a concave rear surface (also referred to as a base curve) 14. The edge 16 joins the front curve 12 and the base curve 14.

Figure 1B:
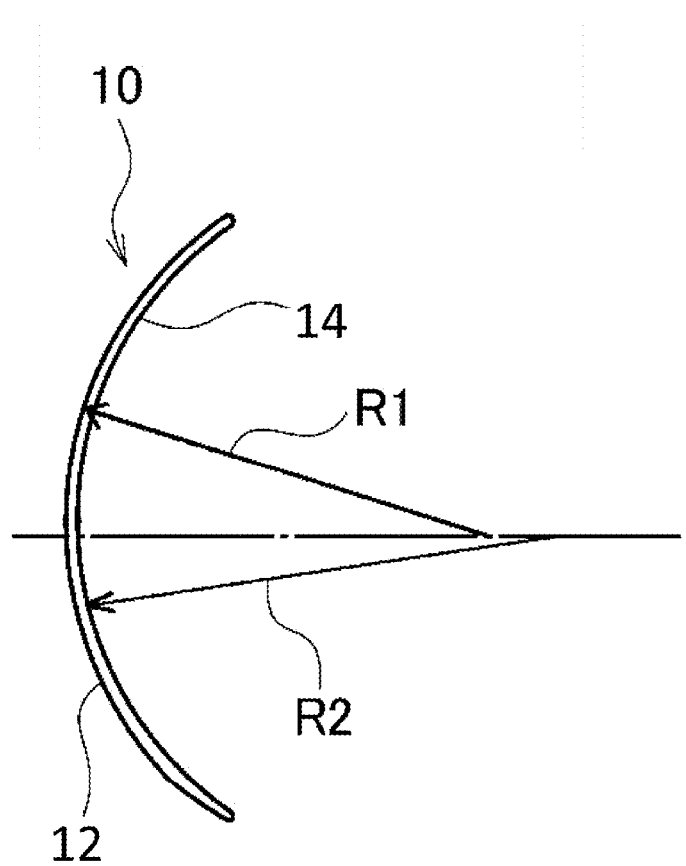
FIG. 1B is a view for explaining a configuration of a contact lens according to an embodiment of the present invention, and is side view of the same contact lens.

An optical portion 18 for defining a refractive power for correcting presbyopia and astigmatism, and a double slab off 20 having an axis stabilization mechanism, are provided to the front curve 12 of the contact lens 10. The base curve 14 is formed in a rotationally symmetrical shape having a multi-step curve matching a corneal shape of a wearer. Namely, the shape of the base curve 14 is the same shape (concentric circle) even if it is cut in an arbitrary longitudinal (diameter) direction (described later). Parameters of the contact lens 10 include, base curve: 8.6 mm, optical center thickness: 0.09 mm, total diameter: 14.2 mm, myopic power: −3.00 D, astigmatic power: −0.75 D, axis: 180° and addition power: +1.5 D. As shown in FIG. 1B, the myopic power is determined by curvature R1 of the front curve 12 and curvature R2 of the base curve 14.

Returning to FIG. 1A, the optical portion 18 has an elliptical toroidal surface (also referred to as a toric surface) in which a horizontal direction is a long axis (main axis) and a vertical direction is a short axis (minor axis). Namely, in order to correct astigmatism, a curved surface (toroidal surface) is formed so that a curvature radius is different between two orthogonal axes (two axes of major axis (long axis) and minor axis (short axis) hereafter unless otherwise specified).

In a case of this example, due to 180° axis, a curvature of the main axis (long axis) on the horizontal meridian 24 is greater than a curvature of the minor axis (short axis) on the vertical meridian 22. The length of the axis of the ellipse or the angle of the ellipse is varied according to a desired refractive power.

Here, the meridian means an intersecting line of the lens surface (the front curve 12 or the base curve 14) and a plane including a lens center axis, and types of the meridians include vertical meridian 22, horizontal meridian 24 and angular meridian 26, any one of which are indicated by one-dot chain lines. The vertical meridian 22 is a meridian passing through the lens upper end portion 28 and the lens lower end portion 30 and the lens midpoint O, and the horizontal meridian 24 is a meridian perpendicular to the vertical meridian 22 and passing through the lens midpoint O. The angular meridian 26 is a meridian on an arbitrary angle (angle θ in this case) centered on the lens midpoint O, and can also be called a line extending radially from the lens midpoint O toward the edge 16. Further, the radial direction is a direction radially extending from the lens midpoint O to an arbitrary distance. The circumferential direction is a direction of a circumference centered on the lens midpoint O, and in a case of this example, a locus indicated by an arc in a fan shape surrounded by the lens midpoint O, the horizontal meridian 24 and the angular meridian 26 can also be called the circumferential direction.

The front curve 12 has mirror image symmetry with respect to the vertical meridian 22 as a boundary. Namely, a right half and a left half have the same shape, bordering vertical meridian 22 passing through the lens midpoint O. The front curve 12 also has mirror image symmetry with respect to the horizontal meridian 24 as a boundary. Namely, the upper half and the lower half have the same shape bordering the horizontal meridian 24 passing through the lens midpoint O. In this way, since the entire lens has the mirror image symmetry with respect to the vertical direction and the horizontal direction, the lens is more easily to be arranged in the cornea center during wearing. Due to improvement of the centering performance of the lens, it is possible to improve the accuracy of correcting presbyopia in the distance vision area and the near vision area allocated to desired areas in the optical portion. Further, it is also possible to use the lens without distinction between left and right eyes. Further, even when the lens carries out 180° rotation on the eye, axis stability is obtained.

In the following description, the angle of the contact lens 10 is determined based on wearing the contact lens 10 on the right eye, and is defined as follows: the lens upper end portion 28 is at a position of 90° (on the eyebrow side), the lens lower end portion 30 is at a position of 270° (on the jaw side), the nose side of the directions parallel to the horizontal meridian 24 is at a position of 0°, and the opposite side (ear side) is at a position of 180°.

Further, the contact lens 10 has mirror image symmetry with respect to the vertical meridian 22 and horizontal meridian 24. Therefore, the cross section of a lens from 0° to 90° (counterclockwise) has the same shape as the cross section of a lens from 180° to 90° (clockwise), from 180° to 270° (counterclockwise), and from 360° (0°) to 270° (clockwise). As an example, the cross section of a lens from 0° to 50° (counterclockwise) has the same shape as the cross section of a lens from 180° to 130° (clockwise), from 180° to 230° (counterclockwise), and from 0° to 310° (clockwise), and the cross section of a lens from 50° to 70° (counterclockwise) has the same shape as the cross section of a lens from 130° to 110° (clockwise), from 230° to 250° (counterclockwise), and from 310° to 290° (clockwise), and the cross section of a lens from 70° to 90° (counterclockwise) has the same shape as the cross section of a lens from 110° to 90° (clockwise), from 250° to 270° (counterclockwise) and from 290° to 270° (clockwise).

Figure 2A:
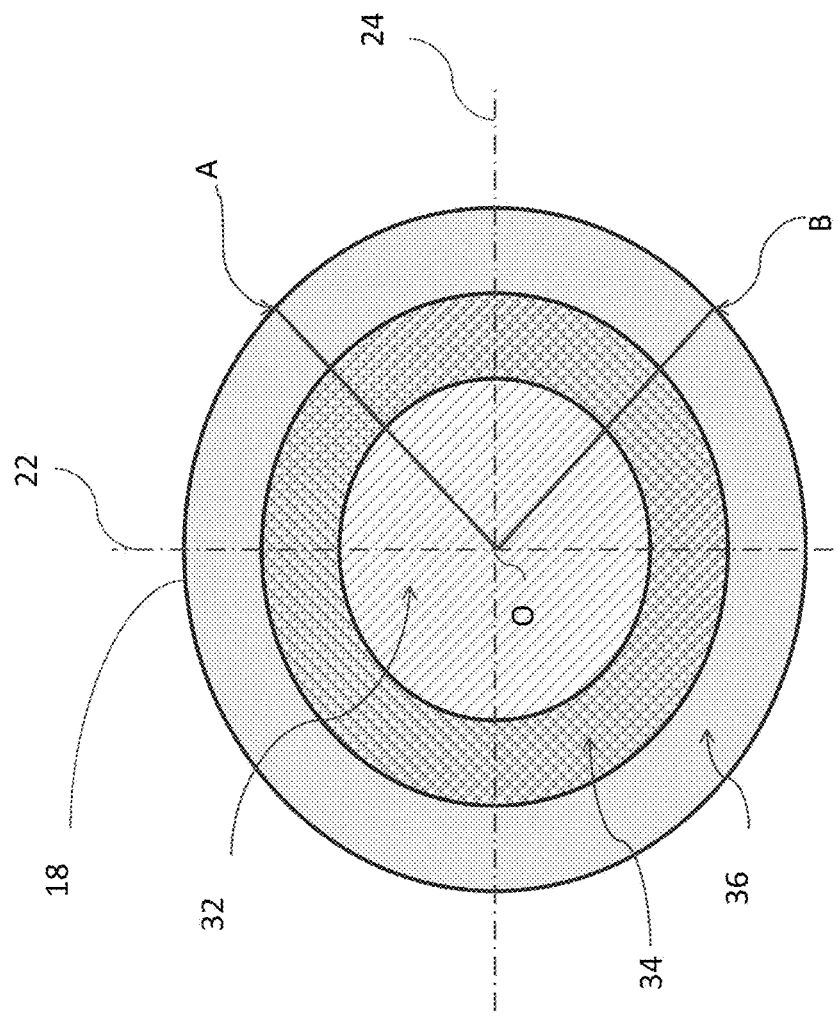
FIG. 2A is a view for explaining a power distribution of an optical portion in the contact lens, and is a front view of the optical portion in the same contact lens.

With reference to FIG. 2A, in the contact lens 10, the distance vision portion 32 for distance vision is arranged at the center of the optical portion 18, an intermediate portion 34 having a power distribution continuously increasing from the power of the distance vision portion is arranged around the distance vision portion 32, and the near vision portion 36 for near vision arranged around the first intermediate portion 34, is arranged as an outermost periphery of the optical portion 18.

Figure 2B:
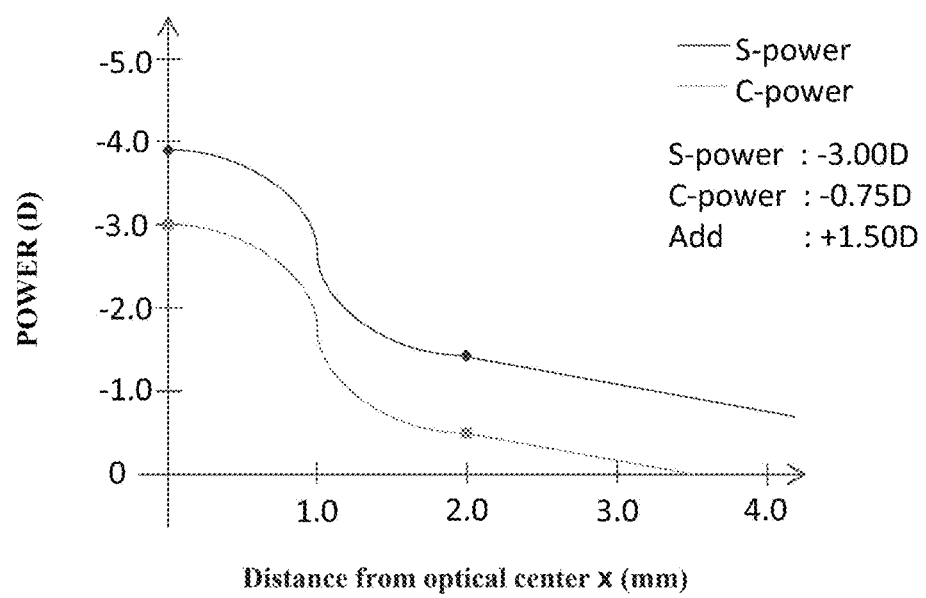
FIG. 2B is a view for explaining the power distribution in the optical portion of the contact lens, and is a graph showing a power distribution state of the lens at OA position.

FIG. 2B shows a power distribution state of the lens at OA position of FIG. 2A. In these figures, the horizontal axis shows a distance x (mm) from the lens midpoint O, and the vertical axis shows a power (D). Due to having the mirror image symmetry with respect to the horizontal meridian 24, the same curve is drawn for the power distribution state of the lens at O-B position shown in FIG. 2A and the power distribution state of the lens at O-A position.

Figure 3:
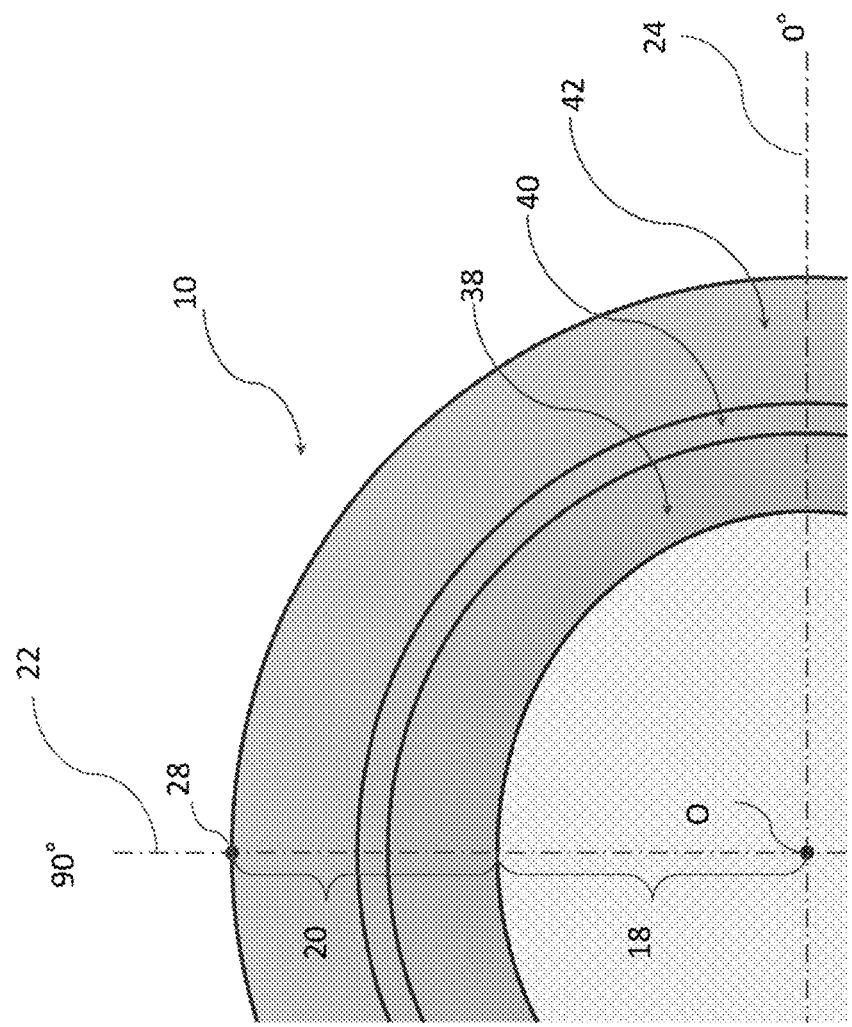
FIG. 3 is a front view enlarging the vicinity of 0° to 90° of the contact lens.

With reference to FIG. 3, the double slab off 20 is divided into a first smoothing portion 38 arranged on the outer periphery of the optical portion 18, an elliptical peripheral portion 40 arranged on the outer periphery of the first smoothing portion 38, and a second smoothing portion 42 connecting the peripheral portion 40 and the edge 16.

The first smoothing portion 38 smoothly connects the optical portion 18 that is elliptical as a result of correcting astigmatism, and the peripheral portion 40 which is an ellipse and annular (explanation for "annular" is omitted thereafter). Thereby, unnecessary friction does not occur between the lens touched during wearing and the upper and lower eyelids, and a foreign body feeling (deterioration in wearing feeling) hardly occurs. Further, the first smoothing portion 38 functions as a buffer area, and therefore even with any refractive power, the elliptical equality of the peripheral portion 40 is secured. When the axis of the contact lens 10 is 180°, it does not matter if there is a matching between the ratio of the length of the major axis to the length of the minor axis of the ellipse in the optical portion 18, and the ratio of the length of the major axis on the horizontal meridian 24 to the length of the minor axis on the vertical meridian of the ellipse in the peripheral portion 40.

The width of the peripheral portion 40 is constant at an any angle. Further, the surface area ratio of the peripheral portion 40 with respect to the front curve 12 is 1:99 to 10:90. In this way, the axis stability is secured while the peripheral portion 40 is minimized, and it is possible to sufficiently secure the region of the second smoothing portion 42 surrounded by the peripheral portion 40 and the edge 16 without narrowing the areas for correcting presbyopia and correcting astigmatism. As a result, the difference from the spherical lens becomes small, and the wearing feeling is improved. Further, by simultaneously providing the optical design having both presbyopia correction and astigmatic correction and the axis stabilizing mechanism on the front surface of the lens, an aspherical shape that matches the cornea can be provided on the rear surface of the lens, which greatly affects the wearing feeling. The peripheral portion 40 will be described later in detail.

The second smoothing portion 42 smoothly joins the elliptical peripheral portion 40 and the perfect circular edge 16. Since the second smoothing portion 42 functions as a buffer region, equality of the peripheral portion 40 of the ellipse and equality of the perfect circular edge 16 are secured. Further, as a result of a smooth joint, unnecessary friction between the lenses touched during wearing and the upper and lower eyelids is reduced, and foreign body feeling hardly occurs.

Figure 4:
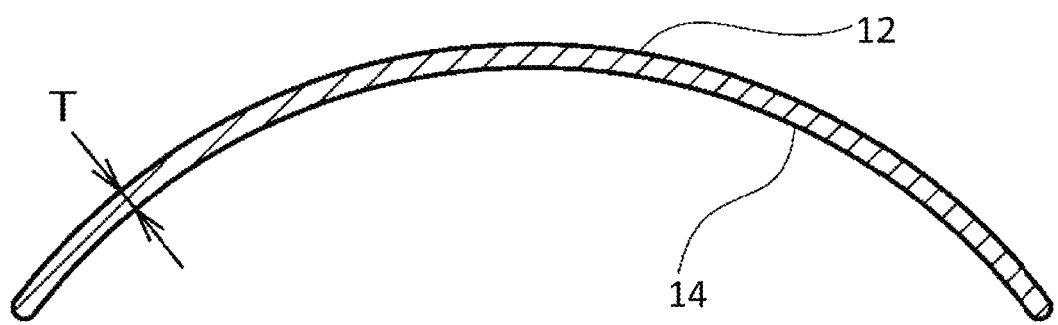
FIG. 4 is a cross-sectional view showing how to define a thickness of the contact lens.

Next, the thickness of the contact lens 10 will be described. As shown in FIG. 4, the thickness T of the contact lens 10 (hereinafter simply referred to as a thickness) is defined as a distance from an arbitrary point on the base curve 14 to a point where a perpendicular line orthogonal to a tangent to this arbitrary point intersects with the front curve 12. The thickness T in the optical portion 18 is regulated in accordance with the degree for correcting visual acuity. On the other hand, the thickness T in the first smoothing portion 38, the peripheral portion 40 and the second smoothing portion 42 excepting the optical portion 18 can be changed to a desired value.

Figure 5A:
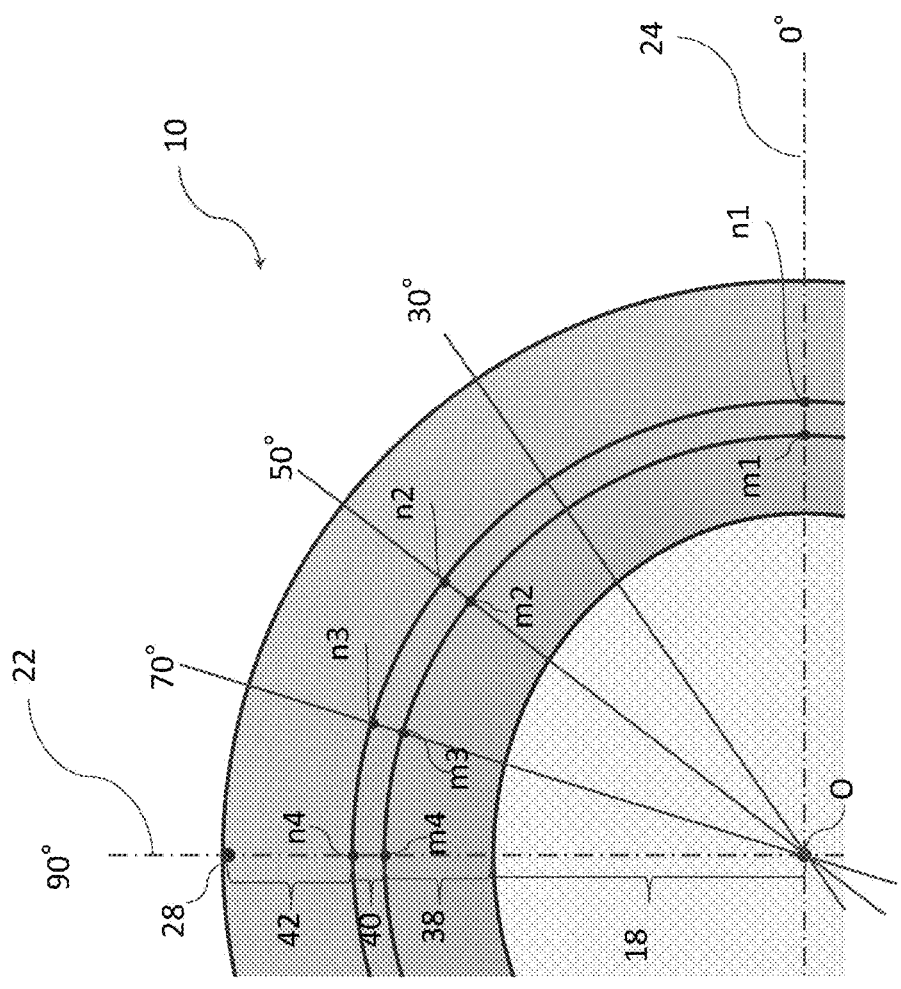
FIG. 5A is a view for explaining a cross section of the lens at a predetermined angle of the contact lens, and is a front view enlarging the vicinity of 0° to 90° of the same contact lens.
Figure 5B:
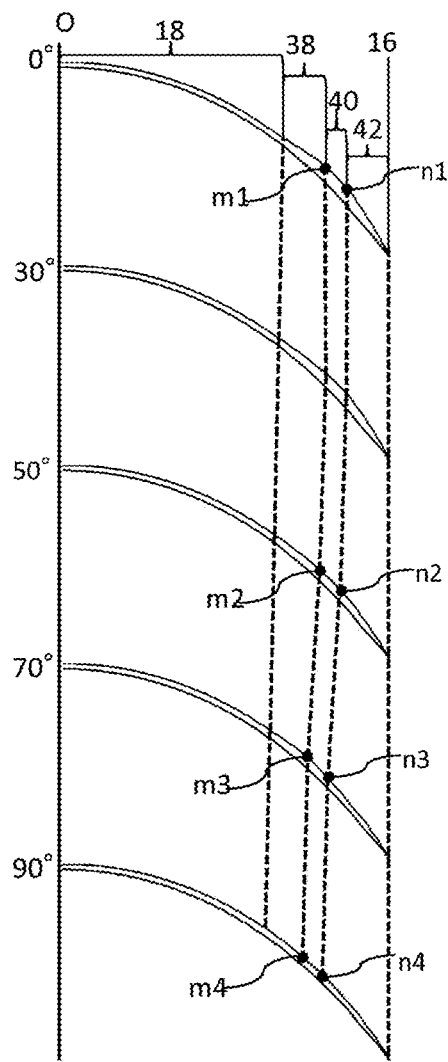
FIG. 5B is a view for explaining a lens cross section at a predetermined angle of the contact lens, and is a schematic diagram showing a lens cross section at an angle shown in FIG. 5A.

When looking at the entire contact lens 10, the thickness of the lens in a radial direction becomes maximum in the peripheral portion 40 at any angle. With reference to FIGS. 5 (a) and (b), in the lens cross section from 0° and 30°, the thickness is gradually increased from the lens midpoint O to point m1 through the optical portion 18 and the first smoothing portion 38, and the thickness is gradually decreased from the point n1 to the edge 16 through the second smoothing portion 42 (that is, "continuously decreases", and the same thereafter). Further, the thickness from point m1 to point n1 is uniform. Namely, the thickness of the peripheral portion 40 becomes maximum at point m1 (point n1). In the lens cross section of 50°, the thickness is gradually increased from the lens midpoint O to point m2 through the optical portion 18 and the first smoothing portion 38, and the thickness is gradually decreased from point n2 to the edge 16 through the second smoothing portion 42. Further, the thickness T is uniform from point m2 to point n2, and at this time, the thickness of the peripheral portion 40 becomes maximum. In the lens cross section of 70°, the thickness is gradually increased from the lens midpoint O to point m3 through the optical portion 18 and the first smoothing portion 38. After the thickness reaches the maximum at point m3, the thickness is gradually decreased to the edge 16 through point n3 and the second smoothing portion 42. In the cross section of the lens of 90°, the thickness T is gradually increased from the lens midpoint to point m4 through the optical portion 18 and the first smoothing portion 38, and the thickness T is gradually decreased from point n4 to the edge 16 through the second smoothing portion 42. Further, the thickness is uniform from point m4 to point n4. Namely, the thickness of the peripheral portion 40 becomes maximum at point m4 (point n4). In this way, the thickness is increased from the lens midpoint O to the peripheral portion 40 through the optical portion 18 and the first smoothing portion 38, and the thickness T is gradually decreased from the peripheral portion 40 to the edge 16 through the second smoothing portion 42.

Figure 6A:
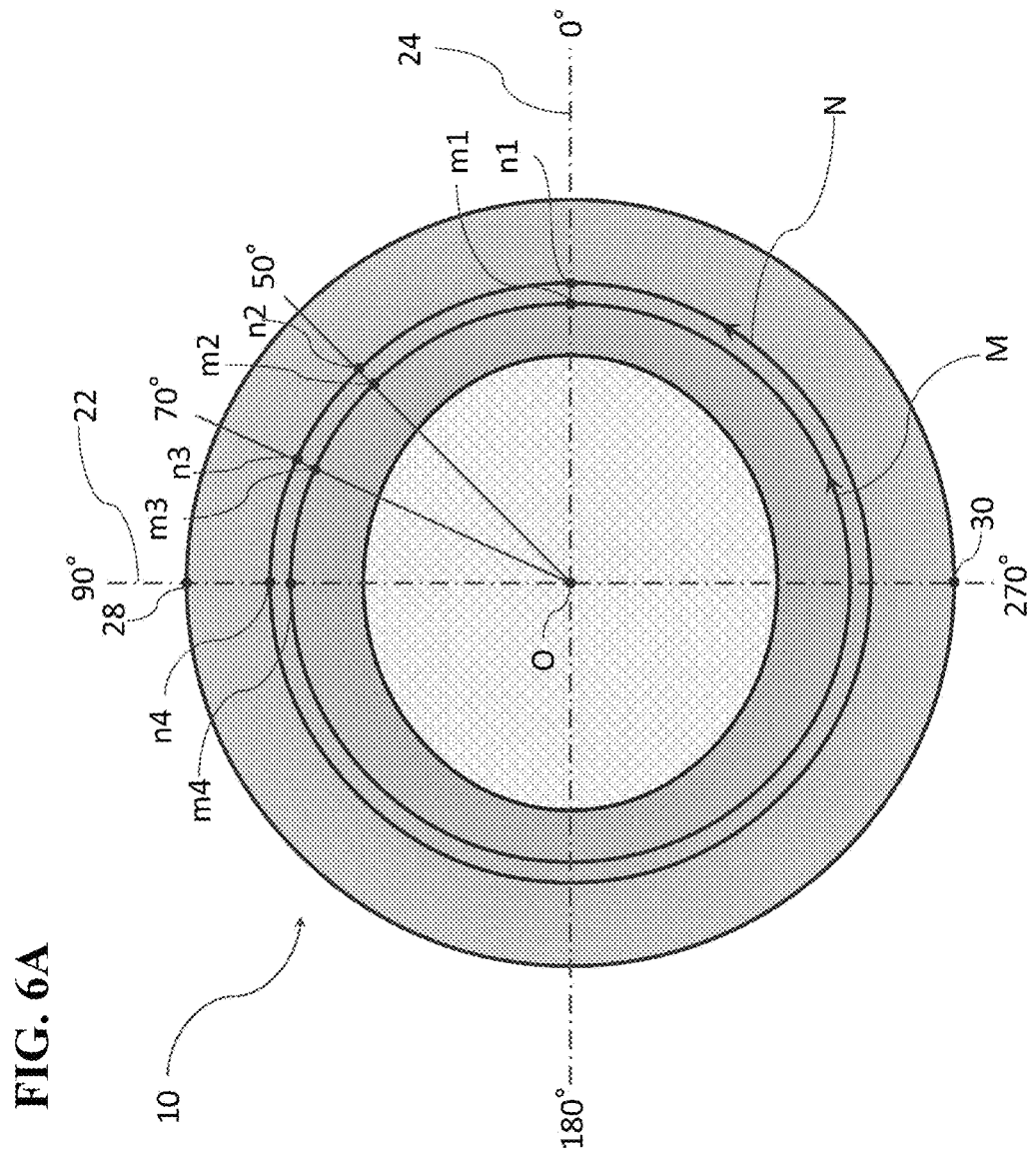
FIG. 6A is a view for explaining a thickness distribution of the contact lens, and is a front view of the same contact lens.
Figure 6B:
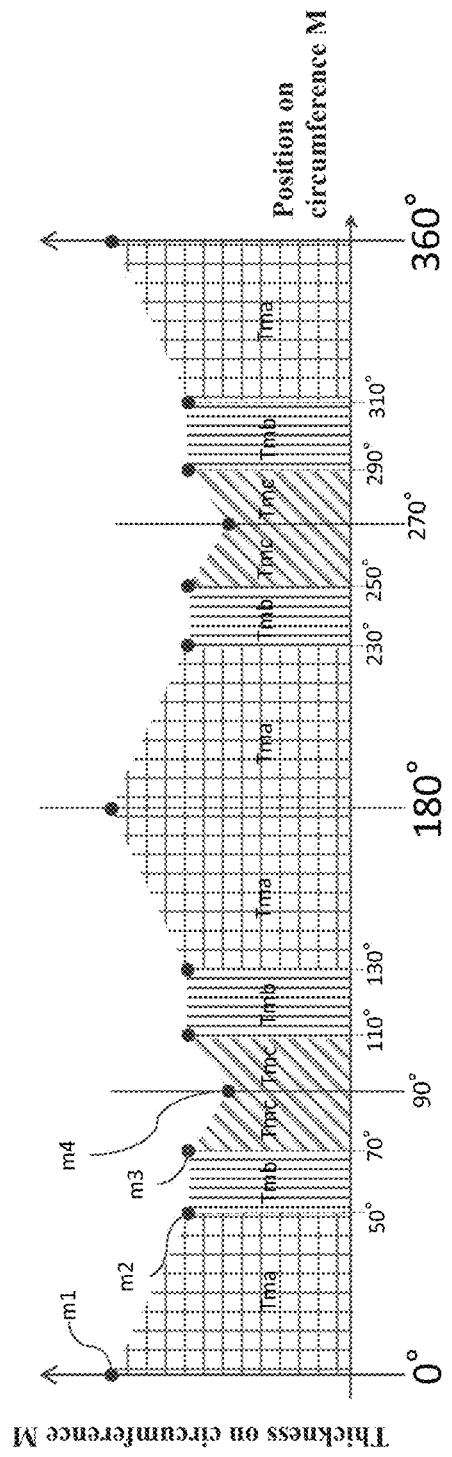
FIG. 6B is a view for explaining the thickness distribution of the contact lens, and is a thickness transition diagram on a circumference M.
Figure 6C:
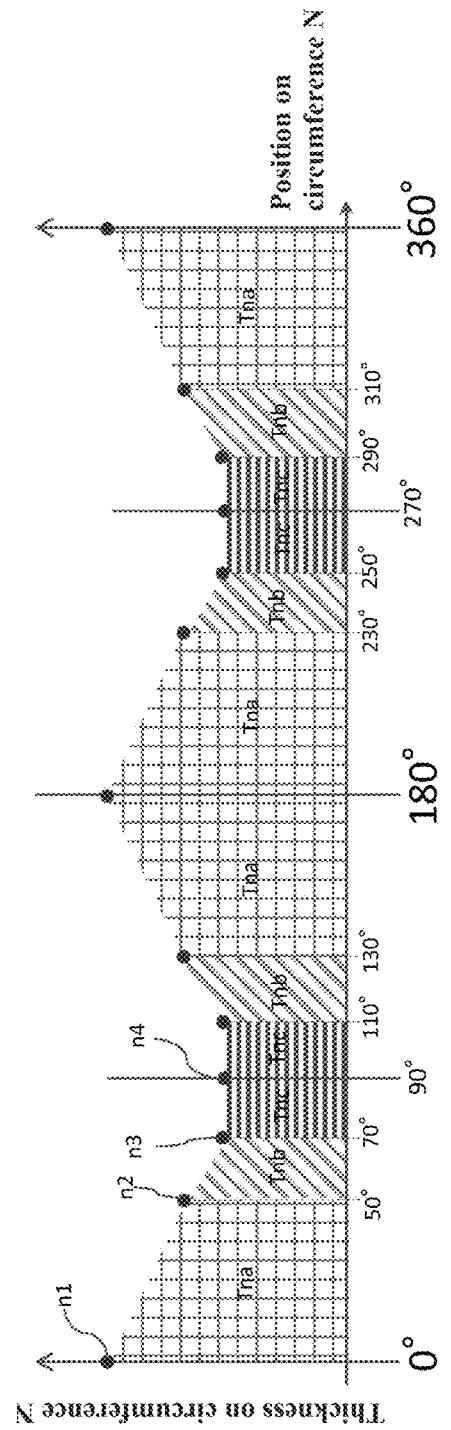
FIG. 6C is a view for explaining the thickness distribution of the contact lens, and is a thickness transition diagram on the circumference N.

Particularly in this embodiment, the thickness of the peripheral portion 40 has a large characteristic. Details will be described below. The thickness of the peripheral portion 40 in a circumferential direction is different for each area classified at a prescribed angle. FIGS. 6B and 6C are schematic views showing the thickness distribution of the peripheral portion 40 at a predetermined angle shown in FIG. 6A, and the degree of the thickness distribution is expressed as shown by the notation of the table of FIG. 10. The thickness distribution viewed throughout the lens is shown in FIG. 7 to be described later.

Figure 7:
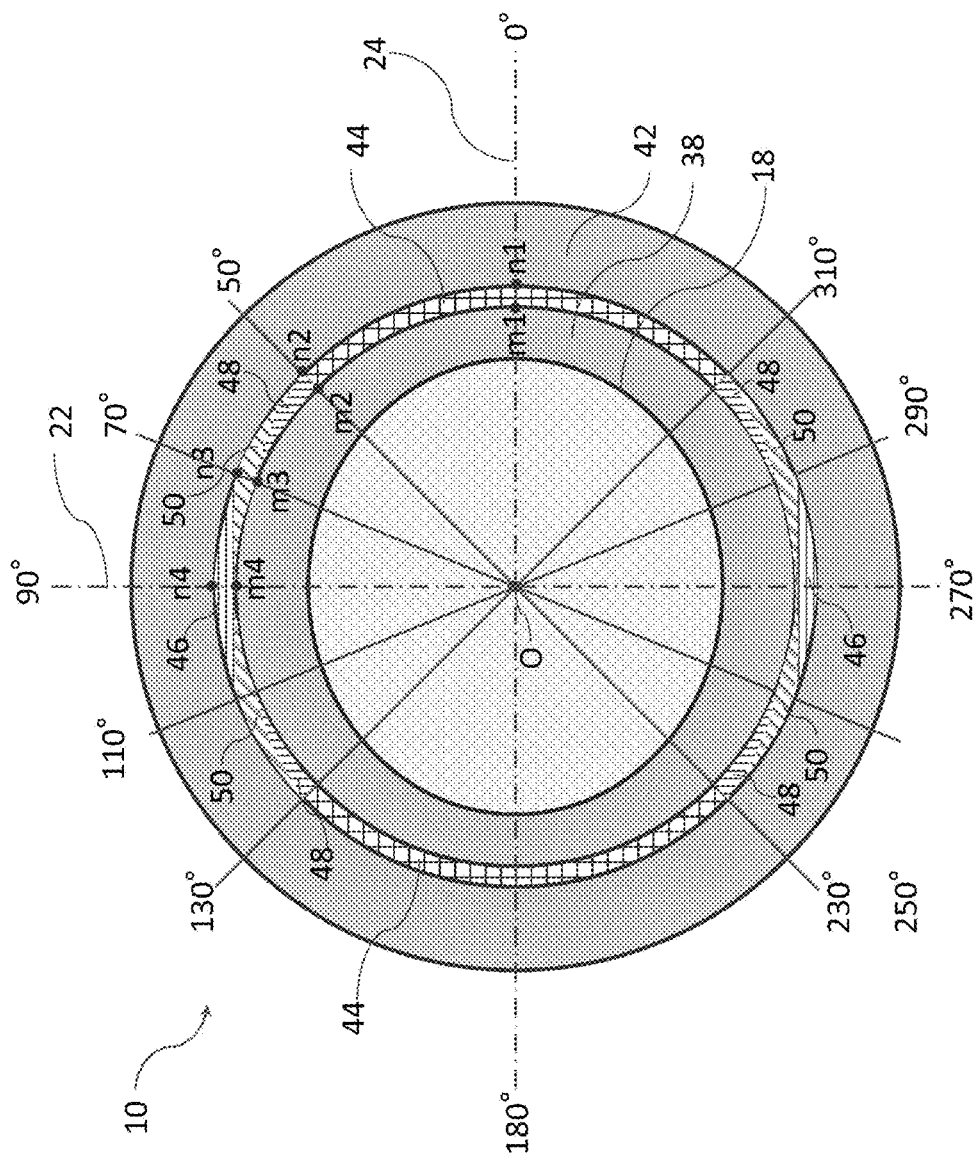
FIG. 7 is a view for explaining the thickness of the peripheral portion of the contact lens, and is a front view of the same contact lens.

As shown in FIG. 7, the peripheral portion 40 is composed of a first peripheral portion 44, a second peripheral portion 46, a first peripheral auxiliary portion 48, and an inclined portion 50. The first peripheral portion 44 is a portion arranged so as to include the horizontal meridian 24 (as an example, so as to straddle) the horizontal meridian 24, and having a shape maximizing the thickness of the contact lens 10 on the horizontal meridian 24. The second peripheral portion 46 is a portion arranged so as to include the vertical meridian 22 (as an example, so as to straddle the vertical meridian 22), and having a shape minimizing the thickness of the contact lens 10 on the vertical meridian 22. The first peripheral auxiliary portion 48 is a portion adjacent to the first peripheral portion 44, and having a surface shape for keeping the thickness of the contact lens 10 constant. The inclined portion 50 is a portion for making a continuous surface by connecting the first peripheral auxiliary portion 48 and the second peripheral portion 46, and having a surface shape of varying the thickness of the contact lens 10. The thickness of the first peripheral portion 44 viewed in the radial direction is constant, and the thickness of the first peripheral portion 44 viewed in the circumferential direction is decreased when rotating from the horizontal meridian 24 to the vertical meridian 22. The thickness of the second peripheral portion 46 is constant, and a radial width of the first peripheral auxiliary portion 48 is decreased when rotating from the horizontal meridian 24 to the vertical meridian 22, and a radial width of the second peripheral portion 46 is increased when rotating from the horizontal meridian 24 to the vertical meridian 22. The boundary between the inclined portion 50 and the second peripheral portion 46 is parallel to the horizontal meridian 24.

Regarding the thickness of the circumference M on the inner side of the peripheral portion 40 (hereinafter also simply referred to as the inner circumferential side or the inner side), as shown in FIG. 7 and FIG. 6B, thickness Tma from point m1 (0°) to point m2 (50°=predetermined rotation angle θ1) is gradually decreased, thickness Tmb from point m2 (50°) to point m3 (70°=predetermined rotation angle θ2) is equal, and thickness Tmc from point m3 (70°) to point m4 (90°) is gradually decreased. Further, regarding the thickness of the circumference N on the outer side of the peripheral portion 40 (hereinafter also simply referred to as the outer circumferential side or the outer side), as shown in FIG. 7 and FIG. 6C, thickness Tna from point n1 (0°) to point n2 (50°=predetermined rotation angle θ1) is gradually decreased, thickness Tnb from point n2 (50°) to point n3 (70°=predetermined rotation angle θ2) is gradually decreased, and thickness Tnc from point n3 (70°) to point n4 (90°) is equal. As a result, thickness T of the peripheral portion 40 becomes maximum at a position of 0°, whereas thickness T becomes minimum at a position of 90°.

Here, the difference between FIGS. 6 (b) and (c) will become clear by referring to FIG. 7. For example, the circumference M inside of the peripheral portion 40 (FIG. 6B), is a first peripheral auxiliary portion 48 in which thickness T is constant from point m2 (50°) to point m3 (70°). Meanwhile, on the circumference N (FIG. 6C) which is the outside of the peripheral portion 40, only one point in the first peripheral auxiliary portion 48 exists only at point n (50°), and instead the inclined portion 50 is present. In addition, on the circumference M inside of the peripheral portion 40 (FIG. 6B), only one point in the second peripheral portion 46 is present at only point m4 (90°), but on the circumference N which is the outside of the peripheral portion 40 (FIG. 6C), an area from point n3 (70°) to point n4 (90°) is the second peripheral portion 46. At a point m2 (50°) on the circumference M inside of the peripheral portion 40, it is assumed that the first peripheral portion 44 and the first peripheral auxiliary portion 48 coexist. The same is applied to other boundaries. However, it may be defined that only one of them is present, from a viewpoint of correctly expressing the contents.

In FIGS. 6B and 6C, it is explained that the thickness is gradually increased (or the thickness is gradually decreased). However, it is possible to adopt any shape as long as the thickness is increased (or decreased), and for example it is also possible to adopt an n th-order function, an exponential function or a logarithmic function, as long as the thickness is increased or decreased by a linear function as shown in FIGS. 6B and 6C.

Figure 8A:
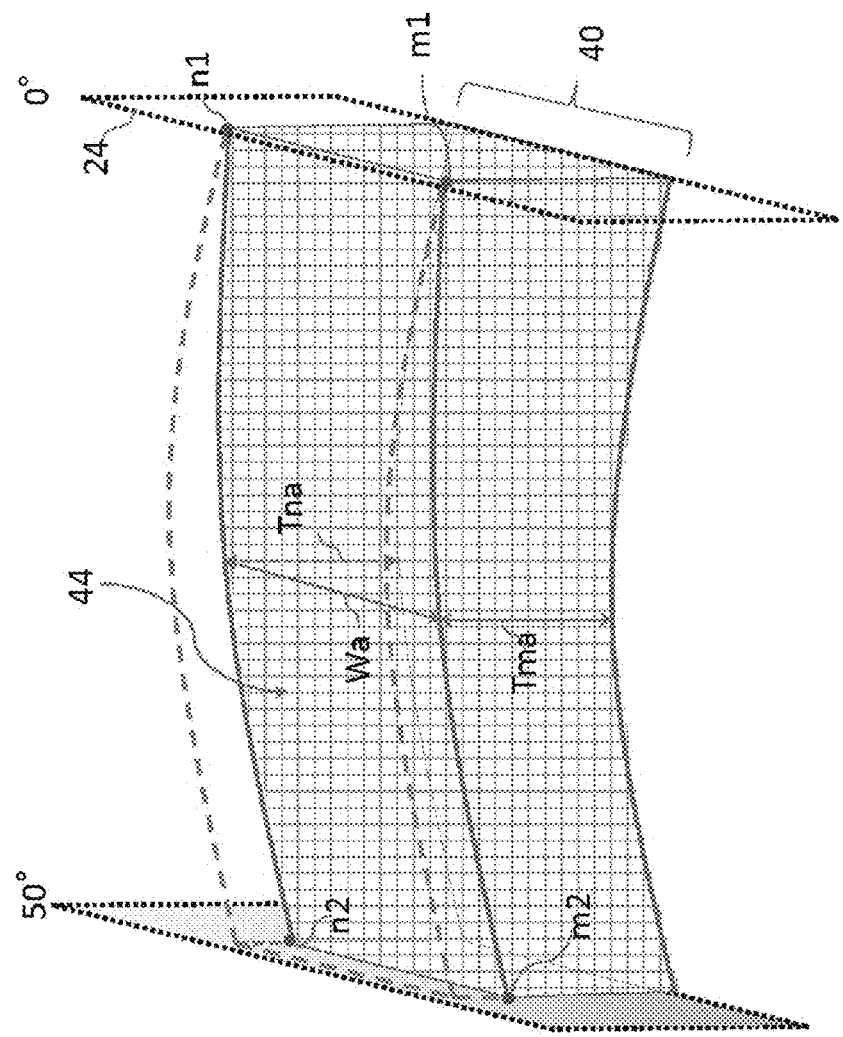
FIG. 8A is a view for explaining the thickness of the peripheral portion of the contact lens, and is a perspective view in which the vicinity of 0° to 50° is cut out.

The region at 0° to 50° indicated by grid in FIG. 7 is the first peripheral portion 44, and FIG. 8A shows a schematic diagram of the peripheral portion 40 cut out by a range of 0° to 50°. The first peripheral portion 44 has a uniform thickness in a radial direction from the horizontal meridian 24 (point m1, point n1) to the boundary of the first peripheral auxiliary portion 48 (point m2, point n2). Namely, thickness Tma at point m1 and thickness Tna at point n1 are the same height, and thickness Tma at point m2 and thickness Tna at point n2 are the same height. The thickness of the first peripheral portion 44 also becomes maximum on the 0° angular meridian 26 (on the horizontal meridian 24), and becomes minimum on the 50° angular meridian 26. Further, width Wa of the first peripheral portion 44 has the same distance at any angle. Namely, the distance from point m1 to point n1 is equal to the distance from point m2 to point n2. In this way, the first peripheral portion 44 with its thickness maximized in the peripheral portion 40 is arranged so as to straddle the horizontal meridian 24, with its thickness smoothly decreased from 0° to 50° and has a uniform thickness on width Wa at any angle. By arranging the first peripheral portion 44 having the maximum thickness on the horizontal meridian 24, the contact lens 10 is pushed out to the upper eyelid or the lower eyelid and is rotated, and the first peripheral portion 44 moves to the ear side or the nose side. Further, by contacting the eyelid with the first peripheral portion 44 having a uniform thickness in the radial direction, that is, a flat (planar) surface by planes, horizontal directivity is given to the contact lens 10 for every blinking. The maximum thickness of the first peripheral portion 44 can be appropriately set within a range that does not interfere with wearing the contact lens 10. However, it is preferably less than 0.4 mm, and more preferably 0.3 mm or less, in view of wearing feeling and the like.

Figure 8B:
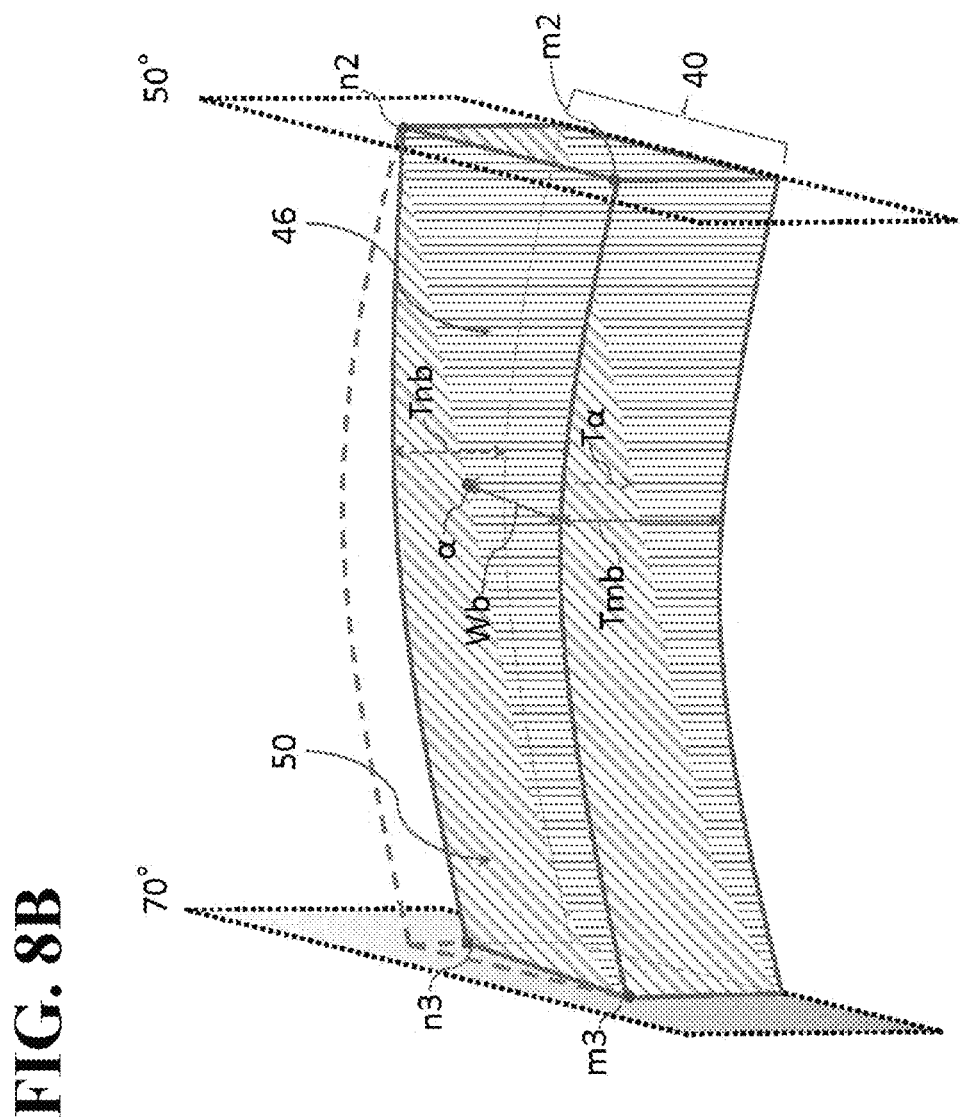
FIG. 8B is a view for explaining the thickness of the peripheral portion of the contact lens, and is a perspective view in which the vicinity of 50° to 70° is cut out.

The region indicated by vertical stripes at 50° to 70° in FIG. 7 is the first peripheral auxiliary portion 48, and FIG. 8B shows a schematic diagram of the peripheral portion 40 cut out by a range of 50° to 70°. The first peripheral auxiliary portion 48 has a flat thickness (the same thickness) from the boundary (point m2, point n2) of the first peripheral portion 44 to the end point (point m3) of the inclined portion 50. Namely, thickness Tmb at point m2, thickness Tmb at point m3 and thickness Tnb at point n2 are the same height. Further, width Wb of the first peripheral auxiliary portion 48 is shortened in a range of 50° to 70°. Namely, width Wb is longest at 50° and width Wb is shortest at 70°. In the cutting plane passing through an arbitrary point α in the range of 50° to 70°, there are thickness Tmb on the circumference M, thickness Tnb on the circumference N, and thickness Tα on the point α. At this time, thickness Tα and thickness Tmb are the same thickness (equal thickness), and thickness Tnb is lower than thickness Tmb (Tα). In this way, the flat first peripheral auxiliary portion 48 is located between the inclined portion 50 and the first peripheral portion 44. Thereby, the first peripheral auxiliary portion 48 functions as a buffer area when the upper and lower eyelids move from the first peripheral portion 44 to the inclined portion 50 or from the inclined portion 50 to the first peripheral portion 44, and smooth axis stability can be provided. It should be noted that the first peripheral auxiliary portion 48 mentioned here has a surface shape, and it is assumed that the thickness is constant in the radial direction and the circumferential direction in the plane (the same thickness anywhere in the plane).

Figure 8C:
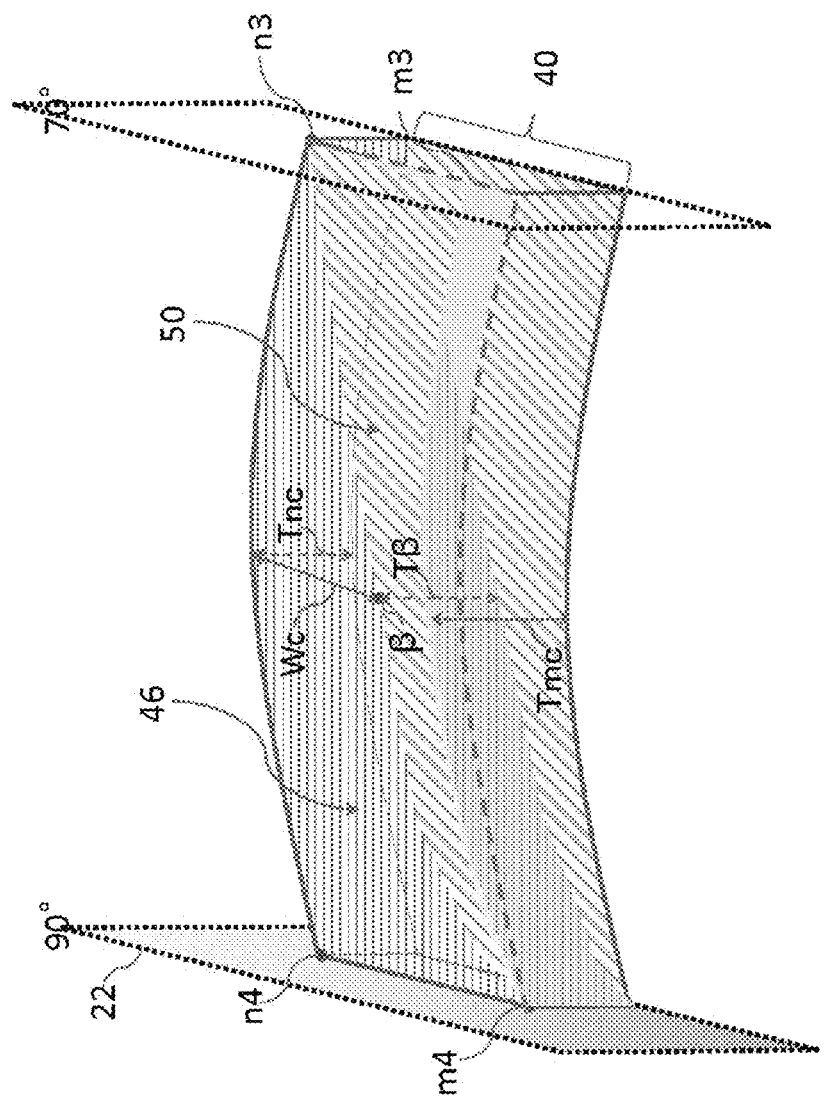
FIG. 8C is a view for explaining the thickness of the peripheral portion of the contact lens, and is a perspective view in which the vicinity of 70° to 90° is cut out.

The region indicated by horizontal stripes at 70° to 90° in FIG. 7 is the second peripheral portion 46, and FIG. 8C shows a schematic diagram of the peripheral portion 40 cut out by a range of 70° to 90°. The second peripheral portion 46 has a flat thickness from the end point (point n3) of the inclined portion 50 to the vertical meridian 22 (point m4, point n4). Namely, thickness Tmc at point m4, thickness Tnc at point n3, and thickness Tnc at point n4 have the same height. Further, width We in the second peripheral portion 46 widens from 70° to 90°. Namely, width We is shortest at 70° and is longest at 90°. There are thickness Tmc on the circumference M, thickness Tnc on the circumference N, and thickness Tβ on the point β, in a cutting plane passing through arbitrary point β in the range of 70° to 90°. At this time, thickness Tβ and thickness Tnc have the same, and thickness Tmc is higher than thickness Tnc (Tβ). In this way, the second peripheral portion 46 having a thinnest thickness in the peripheral portion 40 is arranged to straddle the vertical meridian 22 as a flat thick surface having a distance in the horizontal direction. By arranging the second peripheral portion 46 on the vertical meridian 22 orthogonal to the horizontal meridian 24, the contact lens 10 moves for every blinking so that the second peripheral portion 46 enters the upper eyelid or the lower eyelid. The second peripheral portion 46 mentioned here is a uniform thickness portion including the portion on the vertical meridian 22, otherwise, a linear portion on the vertical meridian 22, on the assumption that the portion on the vertical meridian 22 has a shape having a minimum thickness.

Incidentally, in the present embodiment, the shape of the peripheral portion 40 is an elliptical annular shape whose major axis is the direction of the horizontal meridian 24. As a result, it is possible to ensure a wide second peripheral portion 46 on the vertical meridian 22. Further, the minimum thickness of the second peripheral portion 46 can be appropriately set within a range that does not interfere with wearing the contact lens 10, and is preferably set to a value exceeding 0.10 mm, and more preferably to be 0.15 mm or more, in order to prevent the axis from continuing unstable rotating.

Figure 8D:
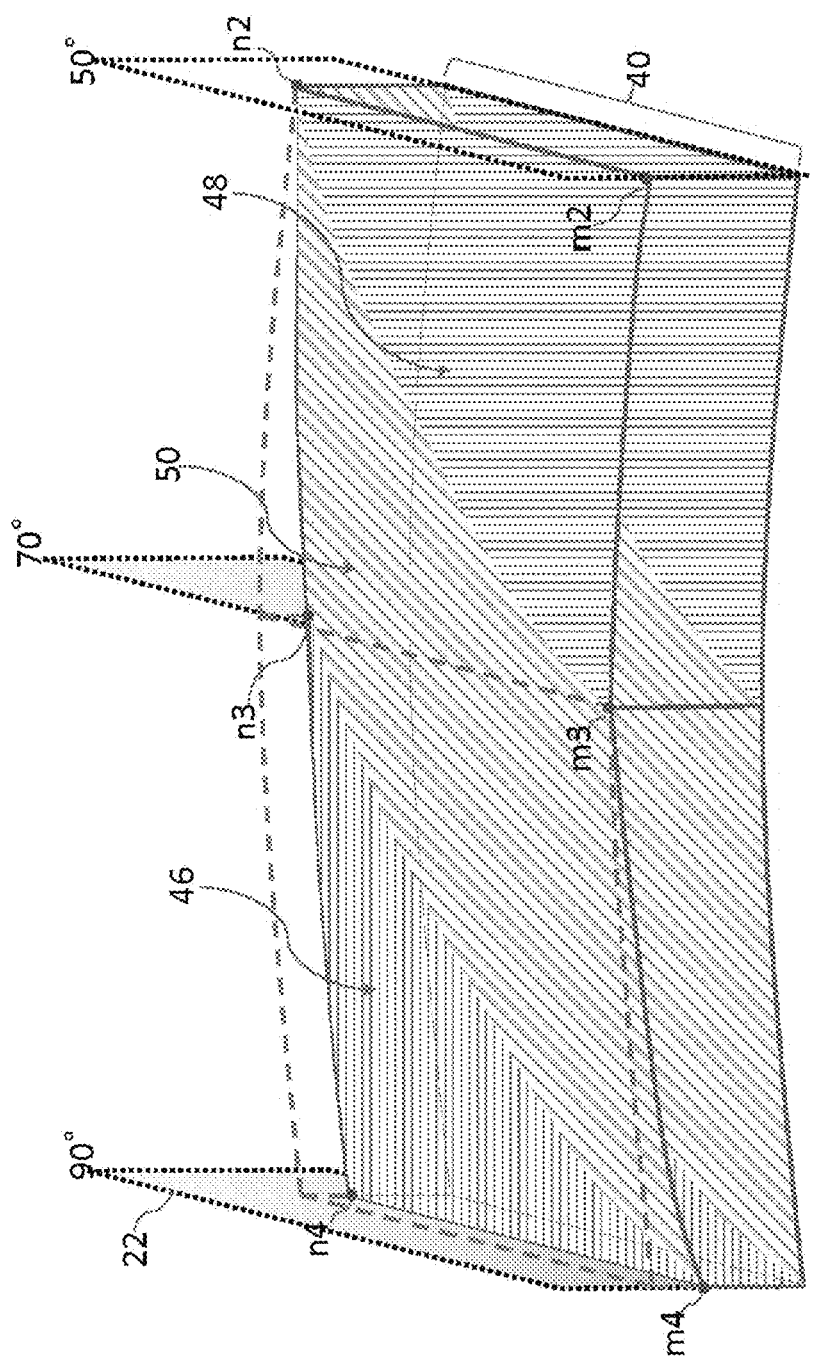
FIG. 8D is a view for explaining the thickness of the peripheral portion of the contact lens, and is a perspective view in which the vicinity of 50° to 90° is cut out.

In FIG. 7, the region indicated by oblique lines at 50° to 90° is the inclined portion 50, and FIG. 8D shows a schematic diagram of the peripheral portion 40 cut out by a range of 50° to 90°. In the inclined portion 50, the thickness is gradually decreased from the boundary (point m3, point n2) of the first peripheral auxiliary portion 48 to the boundary of the second peripheral portion 46 (point m4, point n3). Namely, thickness Tmc at point m4 and thickness Tnc at point n3 have the same height, and thickness Tmc at point m4 (thickness Tnc at point n3) is lower than thickness Tmb at point m3 (thickness Tnb at point n2). By smoothly connecting the first peripheral auxiliary portion 48 which is higher (thicker) than the second peripheral portion 46, and the flat second peripheral portion 46, the inclined portion 50 functions as a buffer region. It should be noted that the inclined portion 50 mentioned here has a surface shape, and the thickness is always changed in the radial direction or the circumferential direction in the plane.

The above results are summarized as follows: the region between the predetermined rotation angle θ1 (50°) from the horizontal meridian 24 (0°) to the rotation angle θ2 (70°) in the peripheral portion 40 is composed of the first peripheral auxiliary portion 48 and the inclined portion 50, and in the case of θ1<θ<θ2, it is preferable that the first peripheral auxiliary portion 48 is arranged on one side of the inner peripheral side or the outer peripheral side of the peripheral portion 40, and the inclined portion 50 is arranged on the other side of the inner peripheral side or the outer peripheral side, to thereby make both coexist and particularly, it is preferable that the first peripheral auxiliary portion 48 is arranged on the inner peripheral side, and the inclined portion 50 is arranged on the outer peripheral side, to thereby make both coexist. The region between the rotation angle θ2 (70°) and the vertical meridian 22 (90°) is composed of the inclined portion 50 and the second peripheral portion 46, and in the case of θ2<θ<90°, it is preferable that the inclined portion 50 is arranged on one side of the inner peripheral side or the outer peripheral side of the peripheral portion 40, and the second peripheral portion 46 in the case of having a surface shape with a uniform thickness, is arranged on the other side of the inner peripheral side or the outer peripheral side, and particularly, it is preferable that the inclined portion 50 is arranged on the inner peripheral side, and the second peripheral portion 46 is arranged on the outer peripheral side, to thereby make both coexist. Then, it is preferable that only the first peripheral auxiliary portion 48 (specifically, the boundary between the first peripheral portion 44 and the first peripheral auxiliary portion 48) is arranged on the angular meridian of the rotation angle θ1 (50°), and only the inclined portion 50 is arranged on the angular meridian of the rotation angle θ2 (70°), and only the second peripheral portion 46 is arranged on the vertical meridian 22.

In this way, exquisite axis stability is improved favorably by providing the region where the first peripheral auxiliary portion 48 and the inclined portion 50 coexist, and the region where the inclined portion 50 and the second peripheral portion 46 coexist, in the detailed configuration as described above. However, as shown in Example 2 described later, even in a case of adopting an arrangement in which the first peripheral auxiliary portion 48 and the inclined portion 50 coexist in the area between a predetermined rotation angle θ (50° in the second embodiment) to 90° from the horizontal meridian 24 (0°) in the peripheral portion 40, and forming the second peripheral portion 46 as a linear portion on the vertical meridian 22, the effect of the present invention is exhibited. Namely, it is one of the characteristics of this embodiment that the first peripheral auxiliary portion 48 is arranged on the inner peripheral side and the inclined portion 50 is arranged on the outer peripheral side in a predetermined rotation angle range of the peripheral portion 40, to thereby make both coexist.

Incidentally, rotation angle θ1 can be appropriately set without being limited to the above angle and can be appropriately set within a range of 45° or more and 60° or less so as to include 50°. In the same way, rotation angle θ2 can also be appropriately set and can be appropriately set within a range of 55° or more and less than 90° so as to include 70°. However, as shown in Examples below, θ1 is preferably set to 50° and θ2 is preferably set to 70°. It should be noted that 0°<θ1<θ2<90° is satisfied.

Further, the first peripheral portion 44 may be set so that the thickness becomes thinner when rotating from the horizontal meridian 24 to the vertical meridian 22, as in the above Example and later-described Example 1, or may be set to have uniform thickness in a range of 0° to θ1 when rotating from the horizontal meridian 24 to the vertical meridian 22, and thereafter to have thin thickness at θ1 to θ2. Further, as in the above example, the first peripheral portion 44 may have a surface shape, or may be linear like the second peripheral portion 46 in the above example. In this case, the following configuration is preferable. Namely, the first peripheral portion 44 has a boundary only with respect to the first peripheral auxiliary portion 48, and a linear or surface-shaped second peripheral portion 46 has a boundary only with respect to the inclined portion 50. Then, it is preferable that the first peripheral auxiliary portion 48 and the inclined portion 50 coexist between the first peripheral portion 44 and the second peripheral portion 46, and the first peripheral auxiliary portion 48 is arranged on the inner peripheral side and the inclined portion 50 is arranged on the outer peripheral side.

Figure 9A:
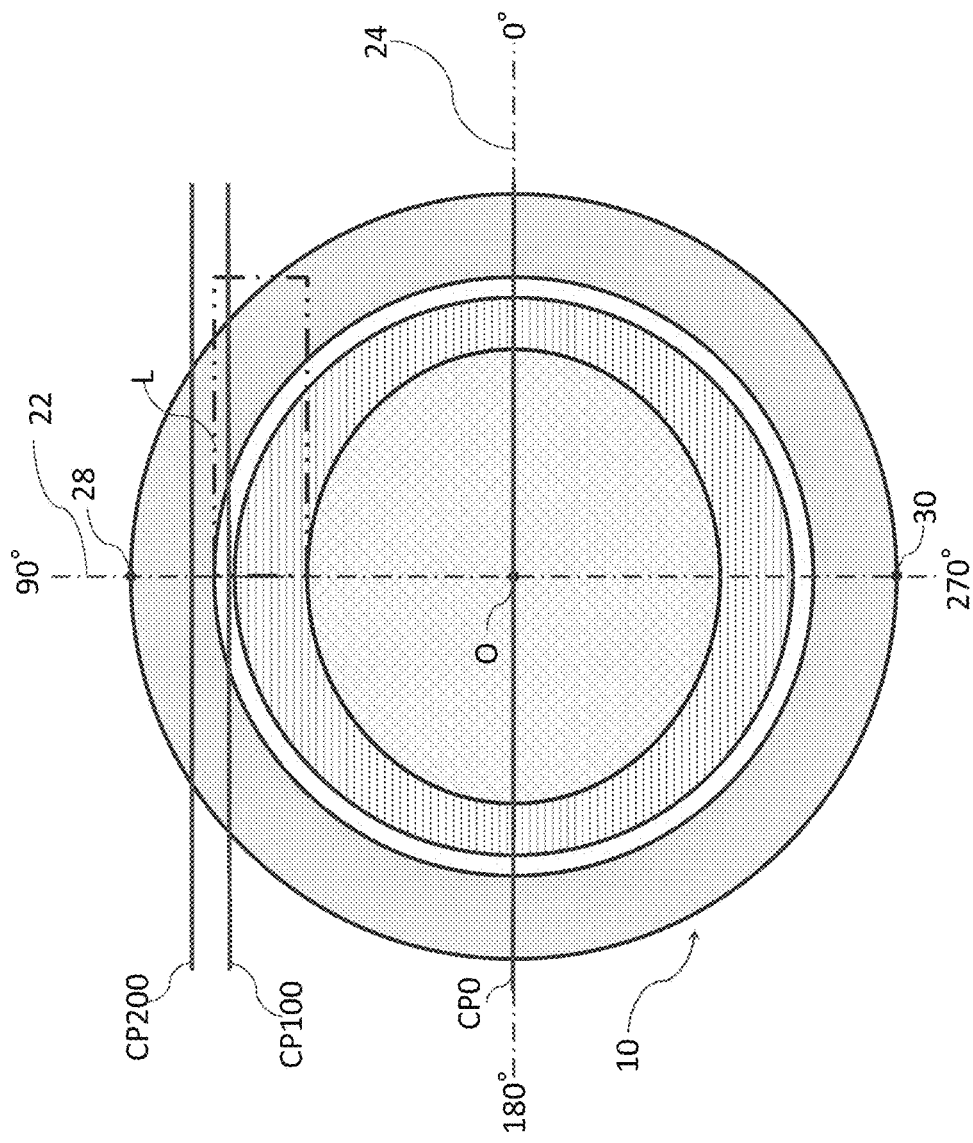
FIG. 9A is a view for explaining a lens cross section along a horizontal meridian near a lens upper end portion of the contact lens, and is a front view of the same contact lens viewed from a front side.
Figure 9B:
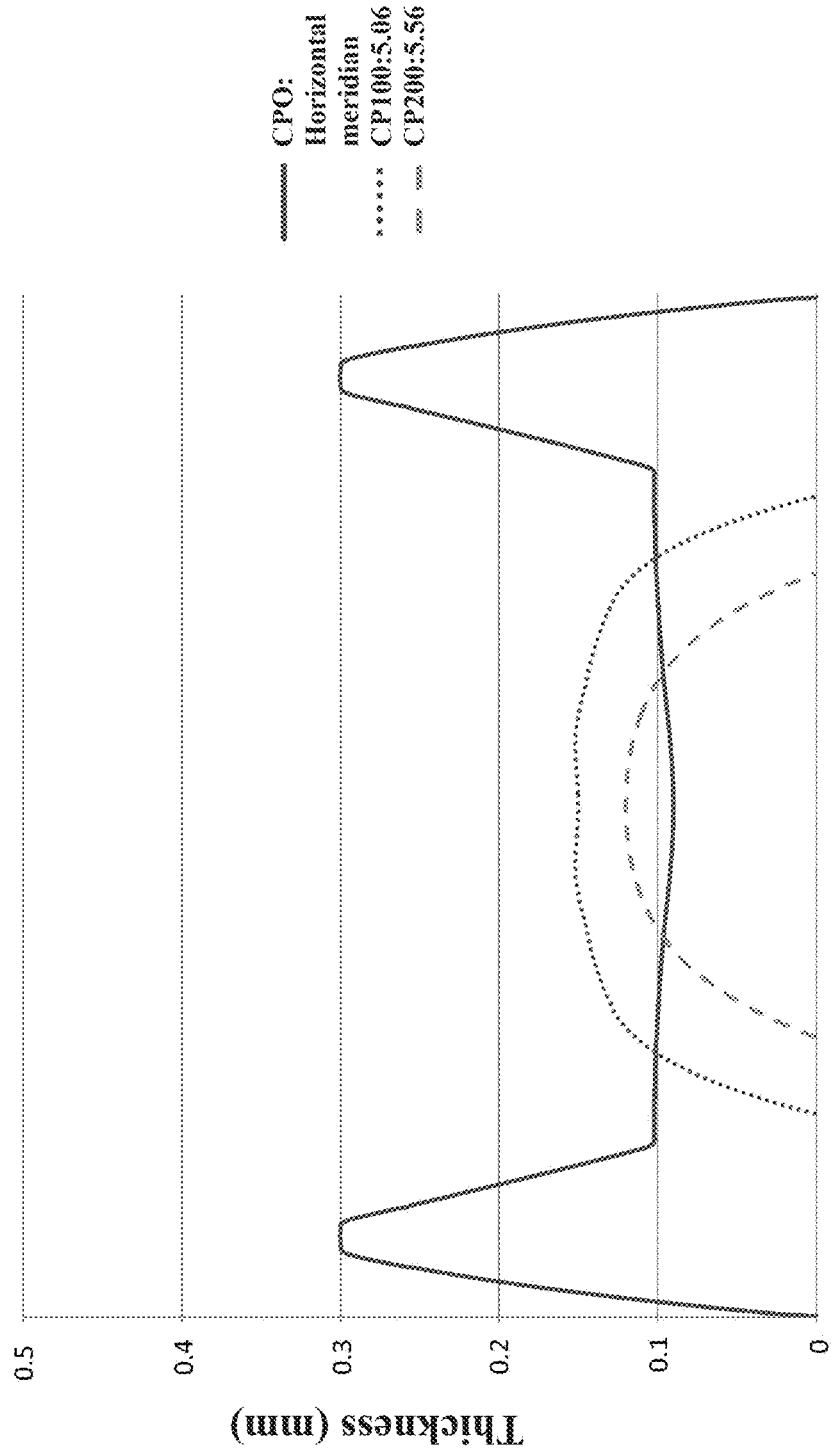
FIG. 9B is a view for explaining the lens cross section along the horizontal meridian near the lens upper end portion of the contact lens, and is a view showing a thickness variation profile of cutting planes CP 0, CP 100 and CP 200 shown in FIG. 9A.

Cutting planes CP0, CP100 and CP200 shown in FIG. 9A are thick cross-sectional profiles partitioned in parallel to horizontal meridian 24, the cutting plane CP0 is the cutting plane on the horizontal meridian 24 (that is, 0° to 180°), the cutting plane CP100 is the cutting plane including the peripheral portion 40 near the center of the cutting plane CP100, and the cutting plane CP200 is the cutting plane on the second smoothing portion 42. With reference to FIG. 9B, it is found that in the cutting plane CP0, the thickness is suddenly increased from the edge 16, and thereafter there is no change in thickness once, then rapidly decreased and gradually decreased toward the vertical meridian 22. In other words, a flat surface is formed at a position where there is no change. In this way, in the vicinity of the horizontal meridian 24 of the peripheral portion 40, a region having the same thickness (that is, the first peripheral portion 44) is formed. In the cutting plane CP100 (cutting plane at the position where the horizontal meridian 24 is moved by 5.06 mm in the vertical direction, the numerical values shown in FIGS. 9 (b) and 9 (d) means a distance moved in the vertical direction), the thickness is suddenly increased from the edge 16, and thereafter gradually increased toward the vertical meridian 22, and there is no change in thickness in the vicinity of the vertical meridian 22. In the cutting plane CP200, the thickness is formed in such a manner that although sudden increase from the edge 16 is observed, gentle increase is observed in the vicinity of the vertical meridian 22. In this way, it is found that in the double slab off 20, the vicinity of the both convex portions (that is, near 0° and 180°) of the cutting plane CP0 is much higher (thicker) than the vicinity of the center (that is, near 90°) of the cutting plane CP200.

Figure 9C:
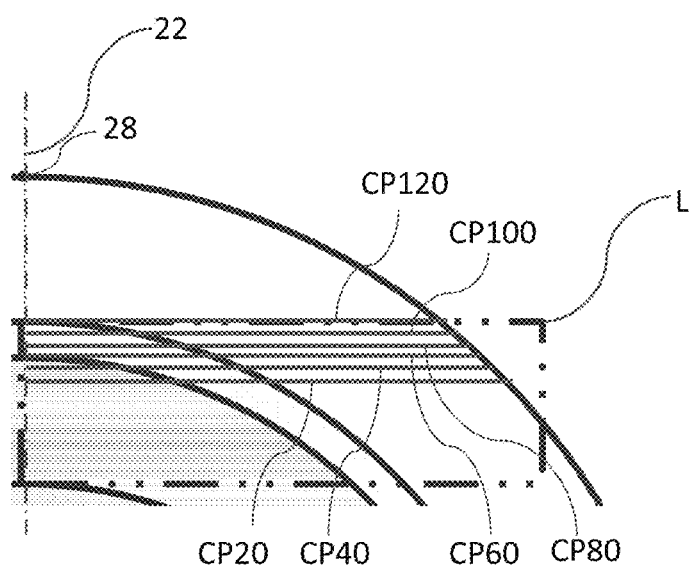
FIG. 9C is a view for explaining a lens cross section along the horizontal meridian near the lens upper end portion of the contact lens, and is an enlarged view showing an inside of a two-dot chain line L of FIG. 9A.

As shown in FIG. 9C, the cutting planes CP20 to CP120 of FIG. 9D show a sectional profile respectively, in which the vicinity of 0° to 90° of the upper end portion 28 is divided at equal intervals in parallel to the vicinity of the cutting plane CP100. The cutting plane CP 20 is the lens cross-section of a portion closest to the optical portion 18, extending to the vertical meridian 22 from the edge 16 through the second smoothing portion 42, the inclined portion 50 and the first smoothing portion 38. Specifically, the thickness is suddenly increased from the edge 16 to the vertical meridian 22, and thereafter there is no change in thickness once, then, a gentle convex shape is formed, and the thickness is decreased smoothly. Similarly to the cutting plane CP20, the cutting plane CP 40 extends to the vertical meridian 22 from the edge 16 through the second smoothing portion 42, the inclined portion 50 and the first smoothing portion 38. As a whole, the thickness is gradually changed as compared with the cutting plane CP20. Specifically, the thickness is suddenly increased from the edge 16 to the vertical meridian 22, and thereafter there is no change in thickness once and a gentle convex shape is formed more smoothly than the cutting plane CP20, and then the thickness is smoothly decreased. Cutting plane CP60 extends to the vertical meridian 22 from the edge 16 through the second smoothing portion 42, the inclined portion 50, the second peripheral portion 46 and the first smoothing portion 38. As a whole, the thickness is gradually changed as compared with the cutting plane CP40. Specifically, the thickness is suddenly increased from the edge 16 to the vertical meridian 22, and thereafter there is no change in thickness, and a gentle convex shape is formed more smoothly than the cutting plane CP40, and after a smooth decrease, the change has disappeared. The cutting plane CP80 extends to the vertical meridian 22 from the edge 16 through the second smoothing portion 42, the second peripheral portion 46, and the first smoothing portion 38. As a whole, the thickness is gradually changed as compared with the cutting plane CP60. Specifically, the thickness is suddenly increased from the edge 16 to the vertical meridian 22, and thereafter there is no change in thickness, and a gentle convex shape is formed more smoothly than the cutting plane CP60, and after a small decrease, the change has disappeared. Similarly to the cutting plane CP80, the cutting plane CP100 extends to the vertical meridian 22 from the edge 16 through the second smoothing portion 42 and the second peripheral portion 46. As a whole, the thickness is gradually changed as compared with the cutting plane CP80. Specifically, after a sudden increase from the edge 16 to the vertical meridian 22, almost no change is noticed. The cutting plane CP120 is a lens cross section at a position closest to the lens upper end portion 28, and extends to the vertical meridian 22 from the edge 16 through the second smoothing portion 42. As a whole, the thickness is gradually changed as compared with the cutting plane CP100. Specifically, after a sudden increase from the edge 16 to the vertical meridian 22, almost no change is noticed. In this way, a flat surface (that is, the second peripheral portion 46) is formed in the vicinity of the vertical meridian 22 of the peripheral portion 40.

As a contact lens base material to be used for manufacturing the contact lens 10, any copolymer may be used as long as it is a copolymer capable of retaining the shape of the contact lens after polymerization, or a copolymer which can be a hydrogel, or preferably a copolymer containing silicone, which can be the hydrogel, and (a silicone hydrogel material) which is conventionally known as a material for soft contact lenses can be used as it is. Further, the contact lens 10 is polymerized by a cast molding method, and the material of the mold at this time may be any material as long as it is a material resistant to the monomer mixed solution, and for example, polypropylene can be used.

Further, in the optical portion 18 of the contact lens 10, the distance portion 32 is arranged at the center, and the first intermediate portion 34, and the near portion 36 are arranged. However, an optical design of the optical portion 18 for presbyopia is not limited thereto, and it is also possible that for example the near portion is arranged at the center, the second intermediate portion having a power distribution continuously decreasing from the power of the near portion, is arranged on the outer periphery of the second intermediate portion, and the distance portion is arranged on the outer periphery of the second intermediate portion.

Further, the center thickness of the contact lens 10 (that is, the center thickness in the optical portion 18) is 0.09 mm, but the present invention is not limited thereto, and for example it is also possible to set the center thickness in a range of 0.05 to 0.20 mm. Namely, in a case that the axis stabilizing mechanism is a prism ballast, it is difficult to decrease the center thickness in order to exhibit a ballast effect. However, in a case that the axis stabilizing mechanism is the double slab off, the pinching effect between the eyelids and eyeballs by blinking is utilized, and therefore it is possible to set the center thickness in a range of 0.05 to 0.20 mm. The thinner the center thickness becomes, the better the wearing feeling is achieved.

In addition, although the above embodiment is a contact lens, the same effect can be obtained in an intraocular lens or the like.

Example

Hereinafter, embodiments of the present invention will be described. For convenience of explanation, reference numerals are omitted.

[Multifocal Toric Contact Lens]

Hereinafter, nine tests while wearing the multifocal toric contact lens according to an example (also referred to as a bifocal lens) will be described. Table 1 (a) shows the features of Examples 1 to 3 and Comparative Examples 1 to 6, and Table 1 (b) shows parameters common to each of the multifocal toric contact lenses used in Examples 1 to 3 and Comparative Examples 1 to 6. Regarding the switching points and angles shown in Table 1 (a), only an angle (0° to 90°) near the nose-side eyebrow is indicated, because all of the lenses under test have mirror image symmetry vertically and horizontally, for example, corresponding to "130°, 230°, 310°" in the case of "50°" and "110° to 130°, 230° to 250°, and 290° to 310°" in the case of "50° to 70°". Each of the peripheral portions of Examples 1 to 3 and Comparative Examples 1 to 6 which will be described later has a shape that is maximized on the horizontal meridian, and minimized on the vertical meridian.

TABLE 1a

| | Shape of peripheral portion | Switching point θ1 | Switching point θ2 | Arrangement First peripheral portion | First peripheral auxiliary portion | Inclined portion | Second peripheral portion | Thickness (mm) of peripheral portion Upper Stage: Position of β point at outside (n1 (horizontal) - n2(q1) - n3(q2) - n4(vertical)) Lower stage: Position of point α at inside (m1 (horizontal) - m2(q1) - m3(q2) - m4 (vertical)) |
|---|---|---|---|---|---|---|---|---|
| Example 1 | Ellipse | 50° | 70° | 0°~50° | 50°~70° | 50°~90° | 70°~90° | 0.3~0.2~0.15~0.15 0.3~0.2~0.2~0.15 |
| Example 2 | Ellipse | 30° | 50° | 0°~50° | 50°~90° | 50°~90° | 90° | 0.28~0.28~0.17~0.15 0.28~0.28~0.17~0.17 |
| Example 3 | Ellipse | 30° | 50° | 0°~50° | 50°~90° | 50°~90° | 90° | 0.24~0.24~0.18~0.15 0.3~0.3~0.18~0.18 |
| Com. Ex. 1 | Perfect circle | 30° | — | 0°~30° | — | — | 30°~90° | 0.28~0.15~0.15 |
| Com. Ex. 2 | Perfect circle | 30° | — | 0°~90° | — | — | 90° | 0.28~0.3~0.125 |
| Com. Ex. 3 | Perfect circle | 50° | 70° | 0°~90° | — | — | 90° | 0.2~0.18~0.12~0.12 0.25~0.22~0.17~0.15 |
| Com. Ex. 4 | Ellipse | 30° | — | 0°~30° | — | — | 90° | 0.28~0.28~0.1 |
| Com. Ex. 5 | Ellipse | 50° | — | 0°~50° | — | — | 50°~90° | 0.28~0.15~0.15 |
| Com. Ex. 6 | Ellipse | 20° | 60° | 0°~90° | — | — | 90° | 0.35~0.35~0.2~0.2 0.35~0.35~0.25~0.25 |

Com. Ex. = Comparative Example

TABLE 1b

| | |
|---|---|
| Base curve (BC) | 8.6 |
| Optical center thickness (CT) | 0.09 mm |
| Total diameter (Dia) | 14.2 mm |
| Myopic power (S-power) | −3.00 D |
| Astigmatic power (C-power) | −0.75 D |
| Axis (Ax) | 180° |
| Addition power (Add) | +1.5 D |

Similarly to the contact lens 10 of the embodiment, the multifocal toric contact lenses of Examples 1 to 3 respectively has a first peripheral portion, a second peripheral portion, a first peripheral auxiliary portion and an inclined portion in an elliptical peripheral portion. For example, the second peripheral portion in Example 1 has a constant thickness surface at point m4-point n4-point n3, and the inclined portion has a surface at point m4-point n3-point n2-point m3, and the first peripheral auxiliary portion has a surface of a constant thickness at point m3-point m2-point n2, and the first peripheral portion has a surface at point m2-point n2-point n1-point m1. Further, in example 1, the first peripheral portion is set so that the thickness becomes thinner as it rotates from the horizontal meridian to the vertical meridian (that is, as it progresses in a circumferential direction from 0° to 90°). Further, the second peripheral portion in Example 2 is a linear portion at point m4 to point n4, the inclined portion has a surface at point m4-point n4-point n3, the first peripheral auxiliary portion has a surface of constant thickness at point m4-point m3-point n3, and the first peripheral portion has a surface at point m3-point n3-point n1-point m1. Further, in example 2, when rotating from the horizontal meridian to the vertical meridian, the thickness is set to be uniform from 0° to θ1, and thereafter becomes thinner from θ1 to θ2. Further in example 3, although having almost the same configuration as in Example 2, difference is that the thickness is not constant when viewed in the radial direction in the first peripheral portion (the thickness is not uniform between the inner peripheral side and the outer peripheral side).

In contrast, Comparative Example 1 shows a multi-focal toric contact lens having a conventional double slab off, and a maximum thickness portion is located on the horizontal meridian, the thickness on the vertical meridian becomes thin, and the peripheral portion has a perfect circle (concentric circle). However, in Comparative Example 1, unlike the above embodiment, the thickness is controlled on one circumferential line. Namely, in Comparative Example 1, the portion on one circumferential "line" under thickness control is the peripheral portion. In contrast, the peripheral portion in the present invention includes a first peripheral auxiliary portion having a "surface shape" and an inclined portion having a "surface shape". Therefore, the portion on the circumferential line in Comparative Example 1 obviously does not have the first peripheral auxiliary portion having the surface shape and the inclined portion having the surface shape, and is totally different from the peripheral portion of the present invention. Accordingly, in Table 3 (area ratio of each portion), Comparative Example 1 shows that the peripheral portion is a portion on the circumferential line and there is no area. Therefore there is no value of the area ratio in the column of the peripheral portion. Instead, the area ratio is described in a form of combining the first smoothing portion or the second smoothing portion with the peripheral portion, in consideration of the peripheral portion as a circumferential line. Further, even in a case of the portion on the circumferential line, there are cases that the minimum thickness portion and the maximum thickness portion may exist, and therefore it is assumed that the second peripheral portion and the first peripheral portion also exist in the first comparative example and based on this assumption, explanation will be given hereafter.

Further, Comparative Example 2 shows a multi-focal toric contact lens whose thickness is gradually thinned from 0° to 90° based on Comparative Example 1. However, as in Comparative Example 1, neither the first peripheral auxiliary portion nor the inclined portion nor the constant thickness surface exists, and there is no surface with constant thickness. Comparative Example 3 shows a multifocal toric contact lens having a shape in which two switching points of thickness are provided based on Comparative Example 1. However, even if the portion on the vertical meridian is defined as the second peripheral portion, the outside has a constant thickness in the circumferential direction in the portion adjacent to the second peripheral portion (θ2 to 90°). Therefore, the inclined portion does not exist in Comparative Example 3. Further, there is no first peripheral auxiliary portion having a surface shape in which the thicknesses are equal in the plane. Therefore, the first peripheral auxiliary portion does not have the inclined portion in Comparative Example 3. In Comparative Examples 1 and 2, one kind of thickness is annularly specified at plural angles, and in Comparative Example 3, plural kinds of thicknesses are annularly specified at plural angles.

Further, Comparative Example 4 shows a multi-focal toric contact lens in which based on Comparative Example 1, the portion from the horizontal meridian to 30° is taken as the maximum thickness portion, and an elliptical peripheral portion is formed by bringing the thickness specified on the vertical meridian closer to the optical portion side. Similarly to Comparative Example 1, neither the first peripheral auxiliary portion nor the inclined portion exists. Comparative Example 5 shows a multi-focal toric contact lens in which based on Comparative Example 1, the switching point is changed from 30° to 50°, a maximum thickness portion is set on the horizontal meridian, and an elliptical peripheral portion is formed by bringing the thickness specified on the horizontal meridian closer to the optical portion side. Similarly to Comparative Example 1, neither the first peripheral auxiliary portion nor the inclined portion exists. The long axis of the peripheral portion in Comparative Examples 3 and 4 is on the horizontal meridian, and the long axis of the peripheral portion in Comparative Example 5 is on the vertical meridian.

Moreover, the multifocal toric contact lens of Comparative Example 6 has an elliptical peripheral portion, in which the maximum thickness portion is located on the horizontal meridian, and has a largest thickness part at a portion from the horizontal meridian to 20°. Similarly to Comparative Example 3, even if the portion on the vertical meridian is defined as the second peripheral portion, the thickness is constant in the circumferential direction both inside and outside in the portion adjacent to the second peripheral portion (θ2 to 90°). Therefore, the inclined portion does not exist in Comparative Example 6. Therefore, it is impossible to specify the first peripheral auxiliary portion adjacent to the inclined portion, and as a result, neither the first peripheral auxiliary portion nor the inclined portion exists in Comparative Example 6. In Comparative Examples 4 and 5, one kind of thickness is specified as elliptical shapes at plural angles, and in Comparative Example 6, plural kinds of thicknesses are specified as elliptical shapes at plural angles.

Wearing tests were carried out on one side of eyes of five testees of different ages. The axial position after 15 minutes wearing was confirmed and the results are shown in Table 2 (a). Table 2 (b) shows an explanation for the symbols shown in Table 2 (a). As a criterion of evaluation, satisfying the case of the following two conditions is applied: "Average point is 6.0 points or higher" and "x evaluation: that is, there is no testee whose evaluation score is 0", and other cases were regarded as being inapplicable.

TABLE 2a

|  | A | B | C | D | E | Average point | Judgement |
|---|---|---|---|---|---|---|---|
| Example 1 | ○ | ○ | ○ | ○ | ▲ | 8.8 | Applicable |
| Example 2 | ○ | ○ | ▲ | ▲ | Δ | 7 | Applicable |
| Example 3 | ▲ | ○ | Δ | ▲ | Δ | 6.4 | Applicable |
| Com. Ex. 1 | X | ▲ | ▲ | X | Δ | 3 | inapplicable |
| Com. Ex. 2 | X | ○ | ○ | X | ○ | 6 | inapplicable |
| Com. Ex. 3 | ▲ | X | ○ | X | ○ | 4.8 | inapplicable |
| Com. Ex. 4 | X | ▲ | ○ | ▲ | ○ | 5.6 | inapplicable |
| Com. Ex. 5 | X | X | Δ | Δ | X | 2.8 | inapplicable |
| Com. Ex. 6 | ▲ | ○ | ○ | Δ | X | 6.2 | inapplicable |

Com. Ex. = Comparative Example

TABLE 2b

| Definition of axis misalignment | | |
|---|---|---|
| Symbol | Evaluation point | Misalignment |
| ○ | 10 | 0° or more, less than 15° |
| Δ | 7 | 15° or more, less than 25° |
| ▲ | 4 | 25° or more, less than 35° |
| X | 0 | 35° or more, 45° or less |

As shown in Table 2 (a), the axis stability was better in Examples 1 to 3 than in Comparative Examples 1 to 6.

Table 3 shows the ratio of a surface area of a front surface with respect to each part of the double slab off. Here, it was revealed that the axis stability was remarkably improved when the peripheral portion was about (preferably less than) 10% or less of the front surface. The double slab off in Comparative Examples 1, 2, 4, and 5, is divided into the first smoothing portion and the peripheral portion, and the peripheral portion and the second smoothing portion, because the peripheral portion sandwiched between the first smoothing portion and the second smoothing portion is a boundary having no width (that is, points α and β are located at the same position). In contrast, the double slab off in Examples 1 to 3, Comparative Example 3, and Comparative Example 6, is divided into the first smoothing portion, the peripheral portion, and the second smoothing portion, because the peripheral portion sandwiched between the first smoothing portion and the second smoothing portion has a width (that is, point α and point β have a predetermined distance at any angle).

TABLE 3

| | First smoothing portion | First smoothing portion + peripheral portion | Peripheral portion | Peripheral portion + second smoothing portion | Second smoothing portion |
|---|---|---|---|---|---|
| Example 1 | 14 | — | 9 | — | 34 |
| Example 2 | 5 | — | 8 | — | 45 |
| Example 3 | 10 | — | 13 | — | 35 |
| Com. Ex. 1 | — | 25 | — | 34 | — |
| Com. Ex. 2 | — | 15 | — | 42 | — |
| Com. Ex. 3 | 15 | — | 15 | — | 25 |
| Com. Ex. 4 | — | 11 | — | 47 | — |
| Com. Ex. 5 | — | 20 | — | 38 | — |
| Com. Ex. 6 | 12 | — | 15 | — | 30 |

Com. Ex. = Comparative Example

The above results are summarized as follows: the multifocal toric contact lenses of Examples 1 to 3 have improved axis stability, compared to those of Comparative Examples 1 to 6 having no first peripheral portion, second peripheral portion, first peripheral auxiliary portion, and inclined portion, in the elliptical peripheral portion. Further, it was revealed that the axis stability was remarkably improved when the peripheral portion was about (preferably less than) 10% or less of the front surface.

[Toric Contact Lens]

In another embodiment, six tests while wearing a toric contact lens (also referred to as an astigmatic lens) of the present invention will be described. Table 4 (a) shows the features of Examples 4 and 5 and Comparative Examples 7 to 10, and Table 4 (b) shows parameters common to each of the toric contact lenses used in Examples 4 and 5 and Comparative Examples 7 to 10. Each of the peripheral portions of Examples 4 and 5 and Comparative Examples 7 to 10 which will be described later has a shape having a maximum thickness on the horizontal meridian, and has a shape having a minimum thickness on the vertical meridian.

TABLE 4a

| | Arrangement | | | | | | Thickness of peripheral portion (nm) Upper stage: Position of point β at outside (n1(horizontal) - n2(θ1) - n3(θ2) - n4(veritcal)) Lower stage: Position of point α at inside (m1(horizontal) - m2(θ1) - m3(θ2) - m4(vertical)) |
|---|---|---|---|---|---|---|---|
| | Shape of the peripheral portion | Switching point θ1 | θ2 | First peripheral portion | First peripheral auxiliary portion | Inclined portion | Second peripheral portion |
| Example 4 | Ellipse | 50° | 70° | 0°~50° | 50°~70° | 50°~90° | 70°~90° | 0.3~0.2~0.15~0.15 / 0.3~0.2~0.2~0.15 |
| Example 5 | Perfect circle | 50° | 70° | 0°~50° | 50°~70° | 50°~90° | 70°~90° | 0.3~0.2~0.15~0.15 / 0.3~0.2~0.2~0.15 |
| Com. Ex. 7 | Perfect circle | — | — | 0°~90° | — | — | 90° | 0.3~0.15 |
| Com. Ex. 8 | Ellipse | 50° | 70° | 0°~70° | — | — | 70°~90° | 0.3~0.2~0.15~0.15 |
| Com. Ex. 9 | Perfect circle | 50° | — | 0°~50° | — | — | 50°~90° | 0.3~0.2~0.15 |
| Com. Ex. 10 | Perfect circle | 50° | 70° | 0°~90° | — | — | 70°~90° | 0.25~0.2~0.15~0.15 / 0.3~0.23~0.18~0.15 |

Com. Ex. = Comparative Example

TABLE 4b

| | |
|---|---|
| Base curve (BC) | 8.6 |
| Optical center thickness (CT) | 0.08 mm |
| Total diameter (Dia) | 14.2 mm |
| Myopic power (S-power) | −3.00 D |
| Astigmatic power (C-power) | −0.75 D |
| Axis (Ax) | 180° |

In the toric contact lens of Example 4, the optical portion of Example 1 is simply changed from a design for presbyopia and astigmatism to a design for astigmatism, and the same double slab off as in Example 1 is included. Example 5 shows a toric contact lens with a peripheral portion as a perfect circle based on Example 4.

In contrast, Comparative Example 7 shows a toric contact lens with a conventional double slab off, in which the peripheral portion is a perfect circle, and as in Comparative Example 1, neither the first peripheral auxiliary portion nor the inclined portion is included. Comparative Example 8 shows a toric contact lens in which the peripheral portion based on Comparative Example 6 is an ellipse, and as in Comparative Example 1, neither the first peripheral auxiliary portion nor the inclined portion are included. Comparative Example 9 shows a toric contact lens based on Example 4, in which the peripheral portion is a perfect circle, and as in Comparative Example 1, neither the first peripheral auxiliary portion nor the inclined portion is included. Comparative Example 10 shows a toric contact lens based on Example 4, in which the peripheral portion is a perfect circle, and although the second peripheral portion is included, a range from 0° to 90° is the first peripheral portion (0° to 90° inside, 0° to 70° outside), and neither the first peripheral auxiliary portion nor the inclined portion is included. In Comparative Examples 7 and 9, one kind of thickness is annularly specified at plural angles, and in Comparative Example 8, plural kinds of thicknesses are specified as elliptical shapes at plural angles, and in Comparative Example 10, plural kinds of thicknesses are annularly specified at plural angles.

Wearing tests of Examples 4 and 5 and Comparative Examples 7 to 10 were also carried out in the same manner as in the wearing test shown in Table 2 (a). Results of the axis position are shown in Table 5. Note that symbols shown in Table 5 are the same as those in Table 2 (b).

TABLE 5

|  | A | B | C | D | E | Average point | Judgement |
|---|---|---|---|---|---|---|---|
| Example 4 | Δ | ○ | ○ | ▲ | Δ | 7.6 | Applicable |
| Example 5 | Δ | ○ | Δ | ○ | ○ | 8.8 | Applicable |
| Com. Ex. 7 | Δ | ▲ | ▲ | ▲ | Δ | 5.2 | Inapplicable |
| Com. Ex. 8 | ▲ | Δ | ▲ | Δ | Δ | 5.8 | Inapplicable |
| Com. Ex. 9 | ▲ | ○ | ▲ | ○ | X | 5.6 | Inapplicable |
| Com. Ex. 10 | — | X | ○ | X | ▲ | 3.5 | Inapplicable |

Com. Ex. = Comparative Example

The above results are summarized as follows: the toric contact lens of examples 4 and 5 have improved axis stability, compared to those of Comparative Examples 7 to 10 having neither a part of nor all of the elliptical peripheral portion, the first peripheral portion, the second peripheral portion, the first peripheral auxiliary portion, nor the inclined portion. In Example 5, the shape of the peripheral portion is not an elliptical shape but a perfect circle and an annular shape, but the toric contact lens of Example 5 is sufficiently effective as described above. Therefore, the shape of the peripheral portion in the present invention is not limited to the elliptical shape and the annular shape.

[Contact Lens for Myopia/Hyperopia]

In yet another embodiment, two tests while wearing the contact lenses for myopia and hyperopia of the present invention will be described. Table 6 (a) shows the features of Example 6 and Comparative Example 11, Table 6 (b) shows the parameters common to each of the contact lenses used in Example 6 and Comparative Example 11.

conventional double slab off, in which the peripheral portion is a perfect circle, and as in Comparative Example 7, neither the first peripheral auxiliary portion nor the inclined portion is included. Note that in Comparative Example 11, one kind of thickness is elliptically specified at plural angles, and in Example 6, plural kinds of thicknesses are annularly specified at plural angles.

The wearing tests described in Example 6 and Comparative Example 11 were carried out in the same manner as the wearing test shown in Table 2 (a), and results of the axis position are shown in Table 7. Note that symbols shown in Table 7 are the same as those in Table 2 (b).

TABLE 7

|  | A | B | C | D | E | Average point | Judgement |
|---|---|---|---|---|---|---|---|
| Example 6 | ▲ | ○ | ○ | ○ | Δ | 8.2 | Applicable |
| Com. Ex. 11 | ▲ | Δ | ▲ | ▲ | ○ | 5.8 | Inapplicable |

Com. Ex. = Comparative Example

Table 7 reveals that the contact lens of Example 6 having all features of the present invention has improved axis stability, compared to a conventional spherical lens of Comparative Example 11.

The above results are summarized as follows: the contact lens of Example 6 for myopia has improved axis stability, compared to that of Comparative Example 11 having neither the first peripheral portion, the second peripheral potion, the first peripheral auxiliary portion, nor the inclined portion in the elliptical peripheral portion.

Note that even in the contact lenses for myopia and hyperopia, the content described in the problem of the present invention, that is, the problem of stabilizing the posture of the lens may occur. For example, when wearing lenses among color contact lenses containing designs or patterns, or when the pattern has a vertical direction, it is necessary to wear the lens while correcting the vertical direction. In this case, it is impossible to correctly show the patterns unless the posture of the lens is stabilized like the TABLE 6a

| | Arrangement | | | | | Thickness of peripheral portion (nm) |
|---|---|---|---|---|---|---|
| Shape of the peripheral portion | Switching point $\theta_1$ / $\theta_2$ | First peripheral portion | First peripheral auxiliary portion | Inclined portion | Second peripheral portion | Upper stage: Position of point β at outside (n1 (horizontal) - n2(θ1) - n3(θ2) - n4(vertical)) Lower stage: Position of point α at inside (m1 (horizontal) - m2(θ1) - m3(θ2) - m4(vertical)) |
| Example 6 — Ellipse | 50° / 70° | 0°~50° | 50°~70° | 50°~90° | 50°~90° | 0.3~0.2~0.15~0.15 / 0.3~0.2~0.2~0.15 |
| Com. Ex. 11 — Perfect circle | — / — | 0°~90° | — | — | 90° | 0.3~0.15 |

Com. Ex. = Comparative Example

TABLE 6b

| Base curve (BC) | 8.6 |
|---|---|
| Optical center thickness (CT) | 0.07 mm |
| Total diameter (Dia) | 14.2 mm |
| Myopic power (S-power) | −3.00 D |

In the contact lens of Example 6, the optical portion of Example 1 is simply changed from a design for presbyopia and astigmatism to a design for myopia/hyperopia, and the double slab off of Example 1 is included.

In contrast, the contact lens of Comparative Example 11 is a contact lens for myopia and hyperopia having the toric contact lens. Therefore, even in the above-described contact lens for myopia, there arises a problem of stabilizing the posture of the lens, and as a means for solving this problem, the above-described examples and the configuration described in the above-described embodiment are employed, and it is possible to exhibit the effect of stabilizing the posture of the lens.

DESCRIPTION OF SIGNS AND NUMERALS

10 Multifocal contact lens
12 Front surface (front curve)
14 Rear surface (base curve)

16 Edge
18 Optical portion
20 Double slab off
22 Vertical meridian
24 Horizontal meridian
26 Angular meridian
28 Lens upper end portion
30 Lens lower end portion
32 Distance vision portion
34 First intermediate portion
36 Near vision portion
38 First smoothing portion
40 Peripheral portion
42 Second smoothing portion
44 First peripheral portion
46 Second peripheral portion
48 First peripheral auxiliary portion
50 Inclined portion
L Two dot chain line

The invention claimed is:

1. A contact lens having a convex front surface and a concave rear surface,
the front surface being divided into an optical portion, an edge joining the front and rear surfaces, a first smoothing portion arranged on an outer periphery of the optical portion, a peripheral portion arranged on an outer periphery of the first smoothing portion, and a second smoothing portion connecting the peripheral portion and the edge,
the front surface having mirror image symmetry with respect to a vertical meridian as a boundary extending from an upper end of the lens to a lower end of the lens passing through a midpoint of the lens, and having mirror image symmetry also with respect to the horizontal meridian perpendicular to the vertical meridian at the lens midpoint,
the peripheral portion being arranged to include the horizontal meridian, and configured of:
a first peripheral portion arranged to include the horizontal meridian and having a shape so as to maximize a thickness of the contact lens on the horizontal meridian,
a second peripheral portion arranged to include the vertical meridian and having a shape so as to minimize the thickness of the contact lens on the vertical meridian,
a first peripheral auxiliary portion which is a portion adjacent to the first peripheral portion, having a surface shape so as to keep the thickness of the contact lens constant; and
an inclined portion which is a portion connecting the first peripheral auxiliary portion and the second peripheral portion to form a continuous surface, and having a surface shape that changes the thickness of the contact lens.

2. The contact lens according to claim 1, wherein a radial width of the peripheral portion is constant.

3. The contact lens according to claim 1, wherein a surface area ratio of the peripheral portion to the front surface is 1:99 to 10:90.

4. The contact lens according to claim 1, wherein a thickness in the first peripheral portion when viewed in a radial direction is constant.

5. The contact lens according to claim 1, wherein a thickness in the first peripheral portion viewed in a circumferential direction is decreased when rotating from the horizontal meridian to the vertical meridian.

6. The contact lens according to claim 1, wherein a thickness in the second peripheral portion viewed in a radial direction is constant.

7. The contact lens according to claim 6, wherein a radial width of the first peripheral auxiliary portion is decreased when rotating from the horizontal meridian to the vertical meridian, a radial width of the second peripheral portion is increased from the horizontal meridian to the vertical meridian, and a boundary between the inclined portion and the second peripheral portion is parallel to the horizontal meridian.

8. The contact lens according to claim 1, wherein the optical portion is formed by a toroidal surface having an astigmatism correcting function.

9. The contact lens according to claim 1, wherein in the optical portion, regions of different powers are arranged in an elliptical shape, including a distance vision portion for a distance vision arranged at a center of the optical portion, and a first intermediate portion arranged on an outer periphery of the distance vision portion and having a power distribution continuously increasing from the power of the distance vision portion, and a near vision portion for a near vision arranged on the outer periphery of the first intermediate portion.

10. The contact lens according to claim 1, wherein in the optical portion, regions of different powers are arranged in an elliptical shape, including the near vision portion arranged at a center of the optical portion, a second intermediate portion arranged on an outer periphery of the near vision portion and having a power distribution continuously decreasing from the power of the near vision portion, and a distance vision portion arranged on an outer periphery of the second intermediate portion.

11. The contact lens according to claim 1, wherein a material of the contact lens is a hydrogel or a silicone hydrogel.

12. The contact lens according to claim 1, wherein a center thickness in the optical portion is in a range of 0.05 to 0.20 mm.

13. The contact lens according to claim 1, wherein within a predetermined rotation angle range of the rotation from the horizontal meridian to the vertical meridian in the peripheral portion, the first peripheral auxiliary portion is arranged on one side of an inner peripheral side or an outer peripheral side, and the inclined portion is arranged on the other side of the inner peripheral side or the outer peripheral side, so that the both are made to coexist.

14. The contact lens according to claim 13, wherein the first peripheral auxiliary portion is arranged on the inner peripheral side and the inclined portion is arranged on the outer peripheral side so that the both are made to coexist.

15. The contact lens according to claim 1, wherein a shape of the peripheral portion is made to be elliptical and annular having a long axis in the horizontal direction.

16. A method for manufacturing a contact lens using a cast mold manufacturing method, the contact lens having a convex front surface and a concave rear surface,
the front surface being divided into an optical portion, an edge joining the front and rear surfaces, a first smoothing portion arranged on an outer periphery of the optical portion, a peripheral portion arranged on an outer periphery of the first smoothing portion, and a second smoothing portion connecting the peripheral portion and the edge,
the front surface having mirror image symmetry with respect to a vertical meridian as a boundary extending from an upper end of the lens to a lower end of the lens passing through a midpoint of the lens, and having mirror image symmetry also with respect to the horizontal meridian perpendicular to the vertical meridian at the lens midpoint, the peripheral portion being arranged to include the horizontal meridian, and configured of:

a first peripheral portion arranged to include the horizontal meridian and having a shape so as to maximize a thickness of the contact lens on the horizontal meridian, a second peripheral portion arranged to include the vertical meridian and having a shape so as to minimize the thickness of the contact lens on the vertical meridian, a first peripheral auxiliary portion which is a portion adjacent to the first peripheral portion, having a surface shape so as to keep the thickness of the contact lens constant; and an inclined portion which is a portion connecting the first peripheral auxiliary portion and the second peripheral portion to form a continuous surface, and having a surface shape that changes the thickness of the contact lens.

\* \* \* \* \*